United States Patent [19]
Goto et al.

[11] Patent Number: 5,962,996
[45] Date of Patent: Oct. 5, 1999

[54] INVERTER APPARATUS

[75] Inventors: Naomi Goto, Otsu; Makoto Yoshida, Kusatsu; Norio Yoshida, Moriyama; Susumu Yamano, Kusatsu, all of Japan

[73] Assignee: Matsushita Electric Industrial Co., Ltd., Osaka, Japan

[21] Appl. No.: 08/887,385

[22] Filed: Jul. 2, 1997

[30] Foreign Application Priority Data

Jul. 3, 1996 [JP] Japan .................................. 8-173258

[51] Int. Cl.$^6$ ...................................................... H02K 7/14
[52] U.S. Cl. ............................ 318/4; 318/562; 318/138; 318/439; 307/12; 307/31; 307/155
[58] Field of Search .................... 318/254, 439, 318/138, 4, 5, 105–113, 696, 561, 562, 568.2, 625, 759, 760, 373, 375; 363/123, 125, 127, 131; 307/11, 31–34, 155, 12

[56] References Cited

U.S. PATENT DOCUMENTS

| | | | |
|---|---|---|---|
| 4,491,197 | 1/1985 | Nishiwaki | 187/296 |
| 4,494,056 | 1/1985 | Nishijima et al. | 318/269 |
| 4,931,712 | 6/1990 | DiGiulio et al. | 318/625 |
| 5,212,430 | 5/1993 | Jartyn | 318/34 |
| 5,237,250 | 8/1993 | Zeile et al. | 318/562 |
| 5,309,073 | 5/1994 | Kaneko et al. | 318/500 |
| 5,381,075 | 1/1995 | Jordan | 315/200 A |
| 5,404,089 | 4/1995 | Flanagan et al. | 318/811 |
| 5,582,756 | 12/1996 | Koyama | 219/497 |
| 5,644,202 | 7/1997 | Toriyama et al. | 318/369 |
| 5,661,390 | 8/1997 | Lipo et al. | 318/803 |
| 5,670,851 | 9/1997 | Numazaki | 318/106 |
| 5,686,806 | 11/1997 | Hibbard | 318/800 |
| 5,742,146 | 4/1998 | Langhorst | 318/701 |
| 5,886,422 | 3/1999 | Mills | 307/29 |

FOREIGN PATENT DOCUMENTS 7-304325  11/1995  Japan .

*Primary Examiner*—Brian Sircus
*Attorney, Agent, or Firm*—Sheridan Ross P.C.

[57] ABSTRACT

In an inverter apparatus for converting a direct current to an intermittent current by a converter configured by parallel-connected plural pairs of serially-coupled switching elements, resistance loads are connected across output terminals of the converter and a positive terminal or a negative terminal of a direct current source, and a direct current output can be supplied to the resistance loads from the inverter apparatus by controlling the converter at a low frequency.

17 Claims, 27 Drawing Sheets

F I G. 12
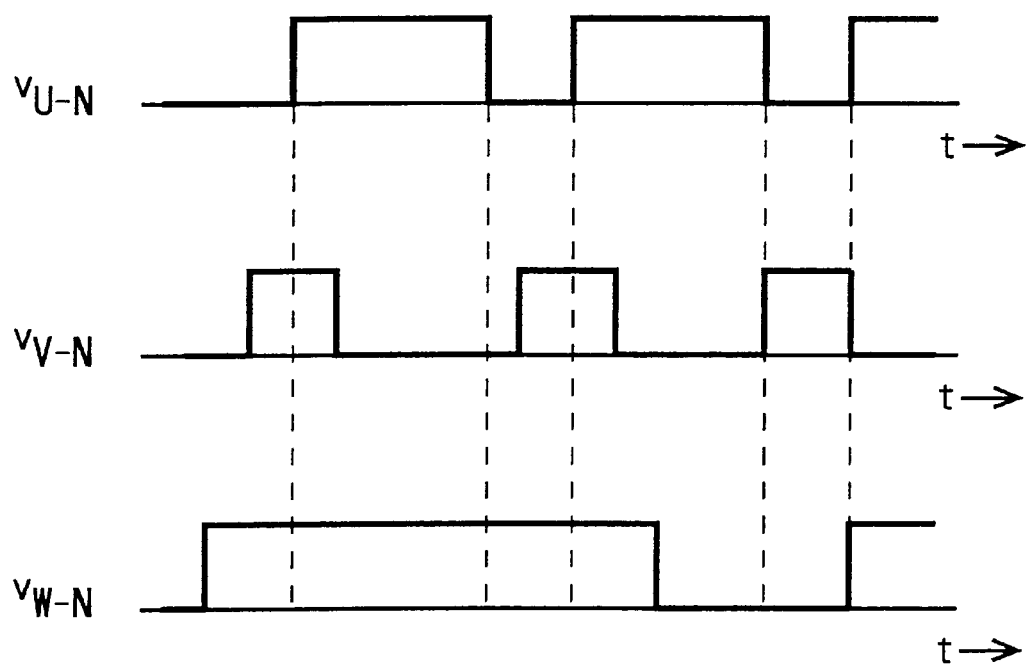

F I G. 13
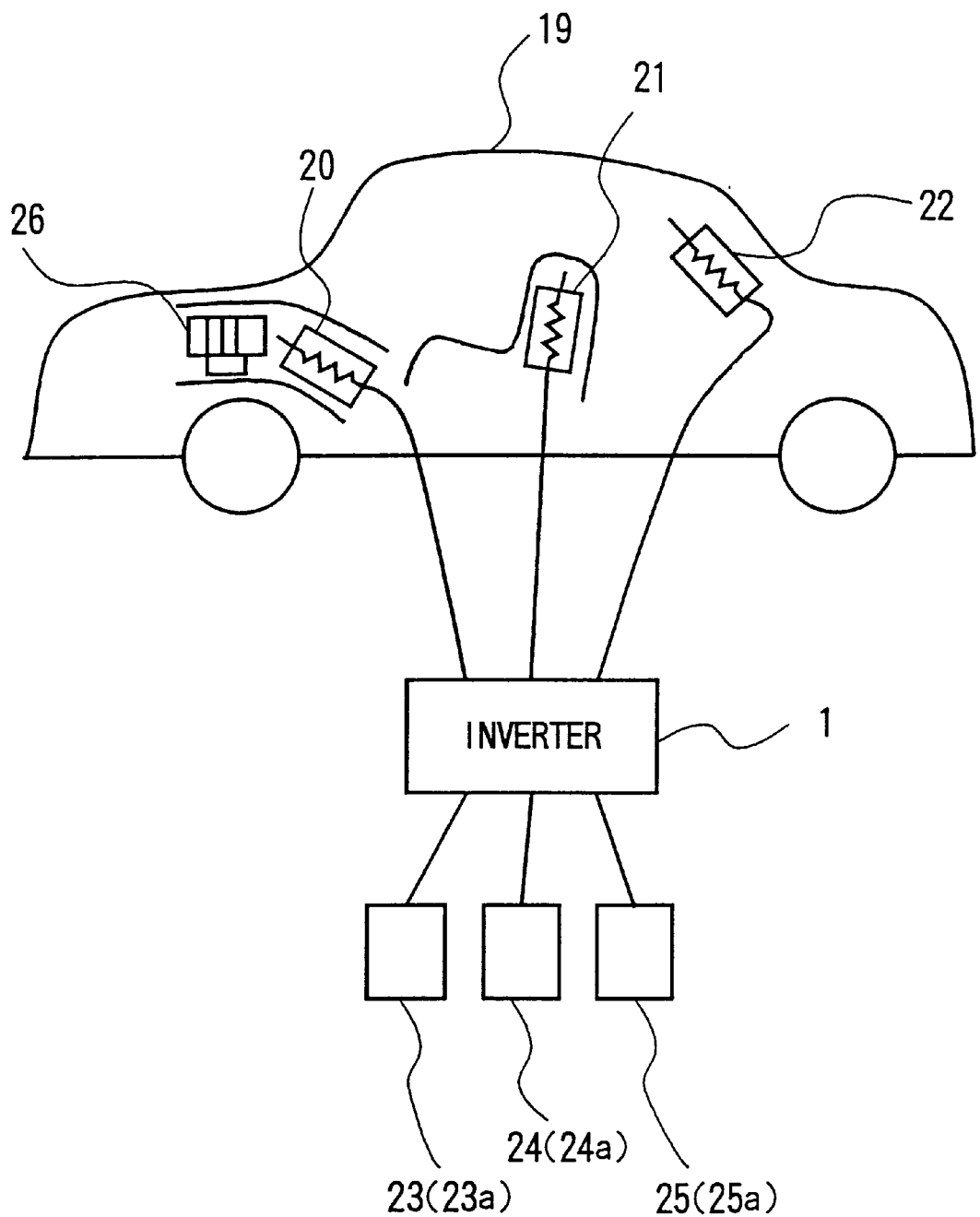

F I G. 14
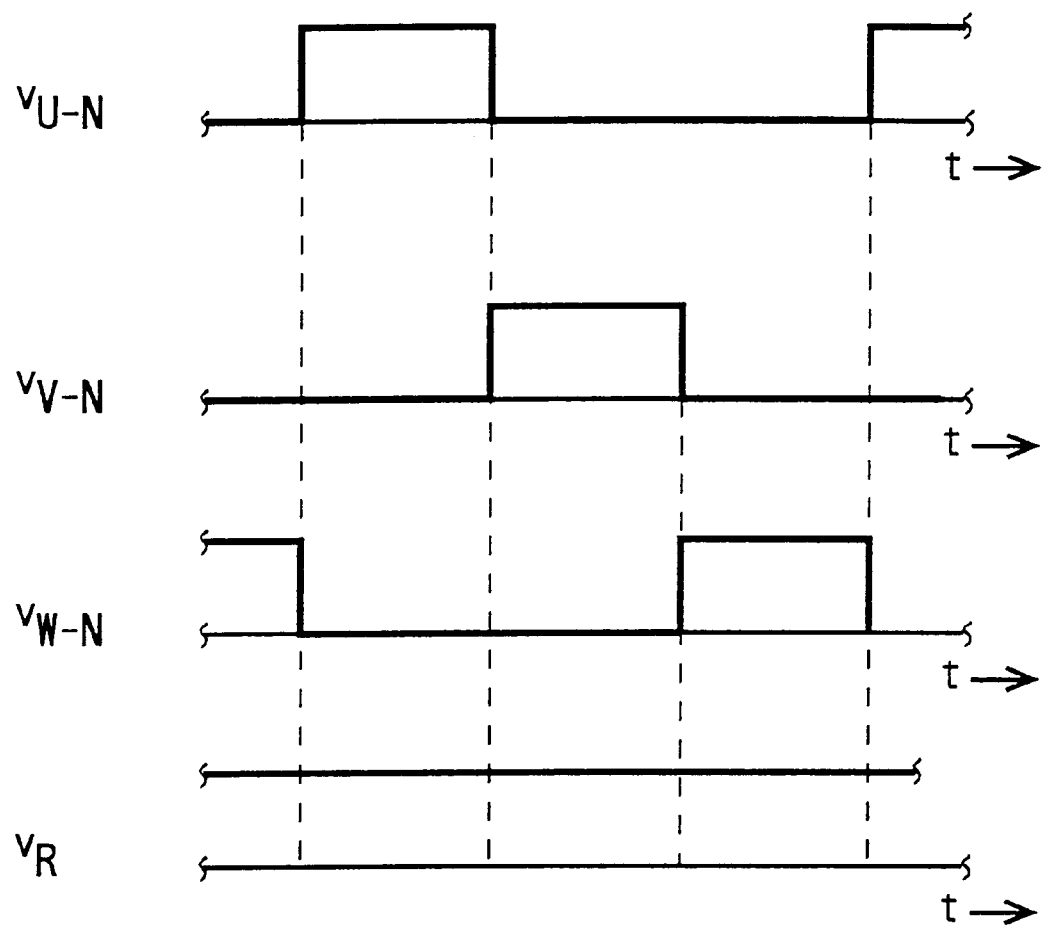

F I G. 18
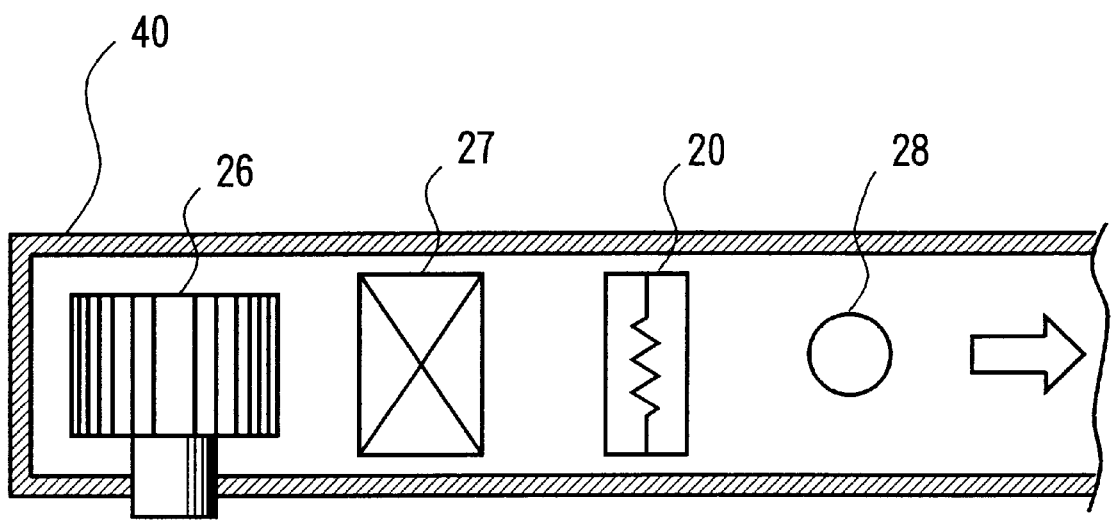

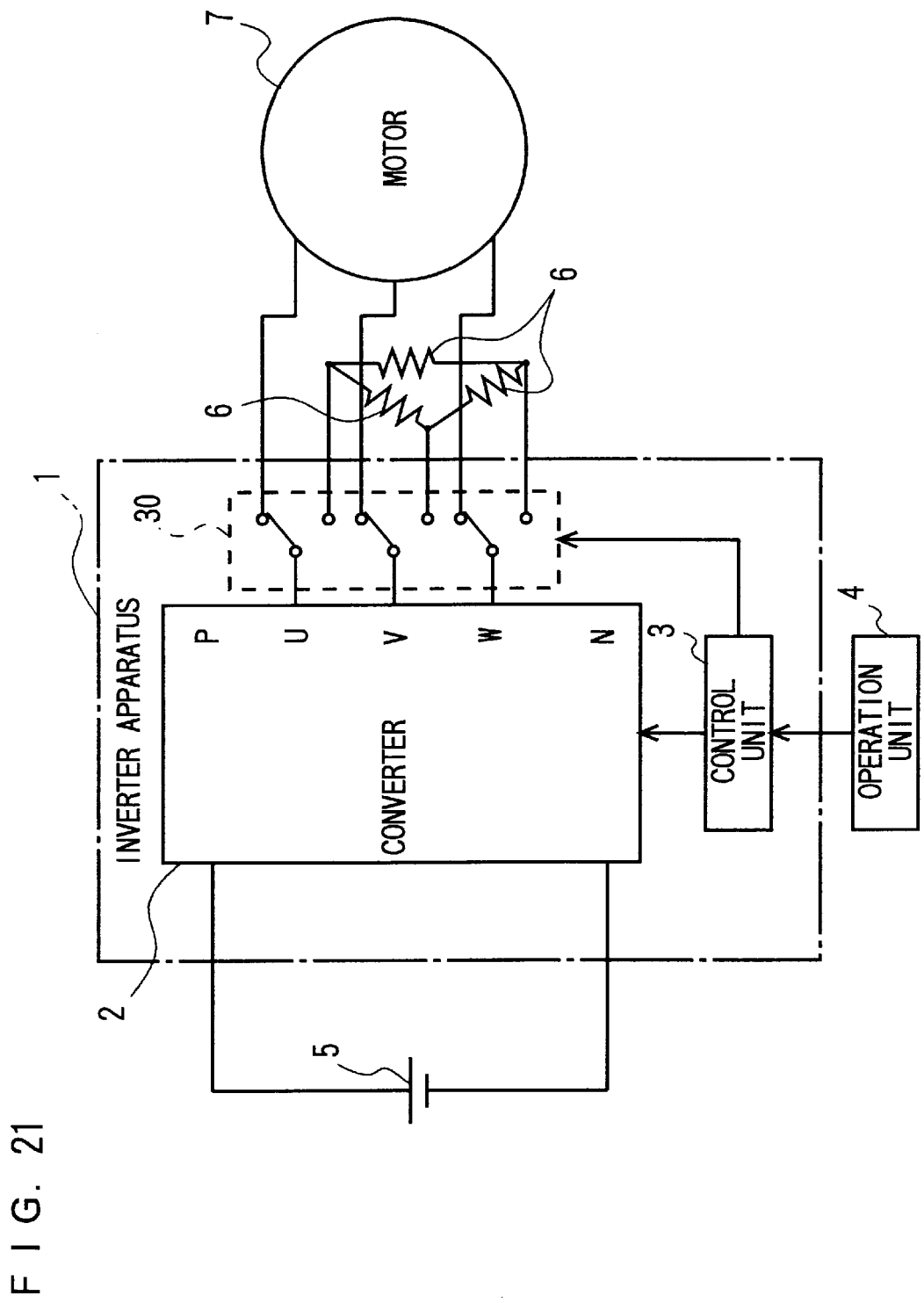
F I G. 21

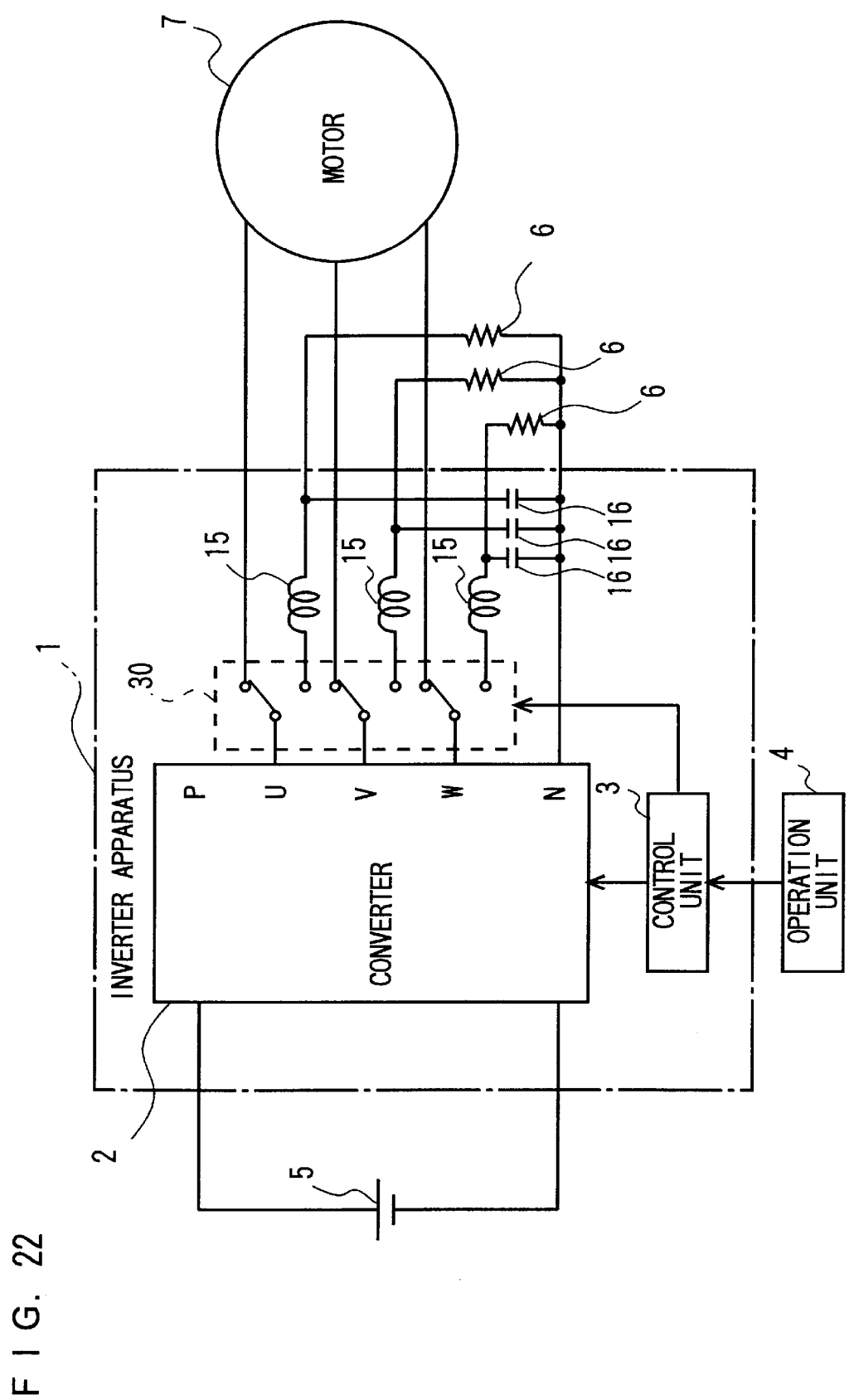
F I G. 22

INVERTER APPARATUS

BACKGROUND OF THE INVENTION

The present invention relates to an inverter apparatus used in an air conditioner or the like.

A conventional inverter apparatus, as shown in FIG. 26, is configured in a manner that a current from a direct current source 5 is converted into an alternating current by an inverter apparatus 1, so that a motor 7 is driven by the alternating current. On the other hand, the inverter apparatus 1 comprises a function of power conversion. Therefore, a load is not limited to the motor 7, and a resistance load (a resistor) 6 such as an electric heater can be used as shown in FIG. 28 by adjusting a frequency of the alternating current and an output voltage. In an air conditioner for a vehicle, an electric compressor is driven by a built-in motor in air cooling operation, or the electric heater is electrified in air heating operation. Effective use of the inverter apparatus by the above-mentioned method is disclosed in the Japanese published unexamined patent application Hei 7-304325. In this case, as shown in FIG. 30, the motor 7 and the electric heater (resistors 6) are alternatively switched as the load of inverter apparatus 1.

In the configuration of the above-mentioned conventional inverter apparatus, a voltage of the direct current source 5 is pulse-width-modulated at about 10 KHz of carrier frequency in alternating current conversion. Therefore, in the case of the resistance load 6, a current having the same waveform as that of the voltage passes through the resistance load 6. As a result, as shown in FIG. 29, a rectangular wave current including a high frequency harmonic current having a high energy is fed to the resistance load 6, and electric noise is likely to be emitted outward. In other words, the inverter apparatus becomes an electric noise source. Furthermore, the below-mentioned problem occurs in the case that a sealed compressor which includes a motor therein and is mounted on an electric automobile and is driven by the inverter apparatus. In the sealed compressor including the motor, refrigerant and lubrication oil enclosed in the compressor works as dielectric substance, and hence a large capacitance is formed between a motor coil and the enclosure of the sealed compressor. In operation at a high carrier frequency such as 10–20 KHz, a part of the high frequency harmonic current is liable to leak outward through the enclosure of the compressor. In this case, the inverter apparatus becomes an inefficient current source which generates large electric noise. The large leakage current gives a harmful influence to electronic circuits of the automobile, and furthermore generates electromagnetic wave noise which exerts a harmful influence on the environment.

Since the pulse-width modulation is performed by switching operation, a peak voltage applied to the resistance load 6 is the voltage of the direct current source 5. Therefore, a withstand voltage of the resistance load 6 must be selected to have a voltage higher than that of the direct current source 5. The resistance load having a high withstand voltage is large in size and expensive in cost. A maximum voltage of the power source of an electric car reaches 450 volts, and it is a problem to cope with a high withstand voltage.

Furthermore, as shown in FIG. 27, waveforms $i_u$, $i_v$, $i_w$ of three-phase output currents are relevant to each other, and are not independent. Therefore, it is difficult to adjust individually each power of three resistance loads 6 which are configured in delta-connection (or Y-connection). In order to adjust the power individually, three inverter apparatus are required. On the other hand, in the case of one resistance load 6, the resistance load 6 is connected across two phases of three phases, therefore, one phase is not used and a burden is imposed on only two phases. Consequently, it is difficult to utilize equally the respective three-phase outputs without deflection and extract the maximum electric power.

In the case where the load of the inverter apparatus 1 comprises the motor 7 and the resistance load 6 (electric heater or the like) as shown in FIG. 30, and these loads are alternatively used by switching frequently with a switch 30, it is desirable that generation of arc or surge is reduced, so that durability is improved and the switch 30 is reduced in size.

The present invention is to solve the above-mentioned outstanding problems, and proposes to provide an inverter apparatus which is easily applied to a load other than the motor.

BRIEF SUMMARY OF THE INVENTION

In order to solve the above-mentioned problems, the inverter apparatus of the present invention comprises a number of switching element pairs of serially-coupled upper switching element connected to the positive side of a direct current source and lower switching element connected to the negative side of the direct current source, a number of switching output terminals for connecting loads to the junctions of the upper switching elements and the lower switching elements and control means for controlling operations of the upper switching elements and the lower switching elements.

The control means activates the upper switching elements and the lower switching elements, and drives a motor by feeding an alternating current through the motor connected across the switching output terminals. The inverter apparatus further comprises an power source output terminal connected to the positive terminal or the negative terminal of the direct current source. A direct current can be output to a load connected across the power source output terminal and the switching output terminal. When the direct current is output, it is unnecessary to generate an alternating current waveform, and therefore, it is unnecessary to generate a carrier signal. Since a direct current itself or an intermittent current at a low frequency is output, harmonic currents are reduced and the inverter apparatus does not serves as an electric noise source or a leakage current source.

A filter circuit is inserted in an output path of the switching output terminal. Consequently, a peak voltage applied to the load can be reduced. The control means controls the switching elements in a manner that outputs of three phases can be individually changed, and further the outputs of three phases can be supplied to one load. Consequently, degree of freedom in selection of the load increases, and usage of the inverter apparatus can be expanded.

Furthermore, connection switching means for switching plural loads (motor, resistance and the like) is disposed in the output path. Switching operation is carried out while a current does not pass through the output path. Consequently, generation of arc or surge is prevented, and it is unnecessary to provide countermeasures against the arc and surge in the switching means, and thereby the switching means can be reduced in size.

In a first aspect of the invention, a power source output terminal is disposed to be connected to the positive side or the negative side of the direct current source, and a direct current can be fed through a load (resistance load) connected across the power source output terminal and a switching output terminal. Since the direct current is fed, a harmonic current does not produced, and it is prevented that the inverter apparatus becomes an electric noise source or a leakage current source. Moreover, in comparison with the case that a direct current is given from the direct current source to the resistance load through a relay, durability is greatly improved because of electrification by semiconductor.

In a second aspect of the invention, in the case that a direct current is let to flow through a load connected across the power source output terminal and the switching output terminal, the control means has a changing function by which operation of the upper switching element and the lower switching element is made different from operation in the case that an alternating current is let to flow through the motor. Consequently, the direct current itself or an arbitrary intermittent current at a low frequency can be output, and generation of electric noise or a leakage current can be prevented.

In a third aspect of the invention, a filter circuit configured by an element having at least inductance and for filtering a current is disposed in a current path passing a direct current through a load connected across the power source output terminal and the switching output terminal. As a result, a peak voltage of the output is suppressed, and the output voltage is lowered. Therefore, it is not necessary that a load having a withstand voltage higher than the direct current source voltage must be selected. Furthermore a high safety is held by lowering the voltage.

In a fourth aspect of the invention, in the case that a direct current is let to flow through the load connected across the power source output terminal and the switching output terminal, the control means controls operations of the upper switching elements and the lower switching elements in a manner that currents having no relation with each other are independently output from plural switching output terminals. Consequently, separate outputs can be supplied to separate loads. Therefore, the inverter apparatus can simultaneously control many kinds of loads.

In a fifth aspect of the invention, in the case that a direct current is let to flow through a load connected across the power output terminal and the switching output terminal, the control means controls operations of the upper switching elements and the lower switching elements in a manner that the outputs from plural switching output terminals do not overlap in time scale. Consequently, a peak current from the direct current source can be controlled. Therefore, a current is made uniform, and a burden on the power source is alleviated. Moreover, switching output terminals of three phases are coupled in common to connect a particular load, and an electric power is supplied from the switching output terminal of each phase in turn. Consequently, a large electric power can be supplied together with control of the burden of each phase.

In a sixth aspect of the invention, in the case that a direct current is let to flow through a load connected across the power source output terminal and the switching output terminal, the control means comprises a voltage detecting function and detects a voltage value of the load through which the above-mentioned direct current passes. The detected voltage is compared with a predetermined voltage, and operations of the upper switching element and the lower switching element are controlled so that the above-mentioned voltage of the load coincides with the predetermined voltage. Consequently, the voltage value of the load through which the direct current passes is read, ON/OFF ratios of the upper switching element and the lower switching element are adjusted, and a stable voltage (electric power) can be usually supplied to the load.

In a seventh aspect of the invention, in the case that a direct current is let to flow through a load connected across the power source output terminal and the switching output terminal, the control means comprises a temperature or a humidity detecting function. A value of temperature or a humidity is detected at a predetermined position adjusted by the load through which the above-mentioned direct current passes, and the detected value is compared with a predetermined temperature or a predetermined humidity. Operations of the upper switching element and the lower switching element are controlled so that the value of the temperature or the humidity at the above-mentioned predetermined position becomes equal to the above-mentioned predetermined temperature or the predetermined humidity. Consequently, a conversion amount is adjusted by reading a resultant value caused by use of the direct current output, and the temperature and humidity which are difficult by controlling a voltage can be stably controlled.

In an eighth aspect of the invention, in the case that a direct current is let to flow through the load connected across the power source output terminal and the switching output terminal, the control means comprises an alternating current sensor for measuring a current passing through the motor. The alternating current sensor is arranged at a circuit position at which a direct current passing through the load can be measured. Consequently, the direct current can be also measured by the alternating current sensor for measuring an alternating current by making coincident the current path of direct current to direct current conversion with the current path of the current sensor. Therefore, it is not necessary to dispose a current sensor dedicated for direct current. Consequently, the inverter apparatus is reduced in size and cost.

In a ninth aspect of the invention, the inverter apparatus of the first aspect further comprises switching means for selectively connecting the junctions between the upper switching elements and the lower switching elements to plural loads; the control means controls in a manner that switching operation by the switching means is carried out while a current does not pass through the switching means. Consequently, arc or surge is not produced in operation of the switching means. Therefore, it is not necessary to take countermeasures against the arc and surge in the switching means. In the case of relay, a relay having a contact capacity close to an output current is usable. In the case of semiconductor switch, a semiconductor switch having a withstand voltage close to an output voltage is usable. Therefore, the switching means is miniaturized and can be assembled in the inverter apparatus. Moreover, since the arc or surge is not produced, durability of the relay does not depend on an electrical life, but depend on a mechanical life.

In a tenth aspect of the invention, connection switching operation by the switching means is controlled by the control means in a manner that the connection switching operation is carried out a predetermined time period after suspension of operations of the upper switching elements and the lower switching elements. A current caused by an inductance component or the like after suspension of the converter extinguishes within a predetermined time period, and therefore the switching means is operated while the current does not passes through the output path. Therefore, generation of arc or surge in switching operation is prevented without fail, and reliability is improved.

In an eleventh aspect of the invention, a current sensor for detecting a current passing through the switching means is disposed at a switching output terminal. The switching means is controlled by the control means in a manner that the connection switching operation is carried out after it is conformed by a signal from the above-mentioned current sensor that a current does not pass through the above-mentioned switching means. Consequently, a current caused by an inductance component or the like is detected after suspension of operation of the switching elements, and the switching means is operated after the current has fallen to zero. Therefore, generation of the arc or surge during switching operation is prevented without fail, and reliability is improve.

BRIEF DESCRIPTION OF THE SEVERAL VIEWS OF THE DRAWING

FIG. 12 is a timing chart of output voltages in a third embodiment of the present invention;

FIG. 13 is a side view of an automobile illustrating arrangement of resistance loads in the third embodiment;

FIG. 14 is a timing chart of output voltages of the inverter apparatus of a fourth embodiment in accordance with the present invention;

FIG. 18 is a cross-sectional view of an air conditioning system illustrating operation in a sixth embodiment of the inverter apparatus in accordance with the present invention;

FIG. 21 is a circuit block diagram of an eighth embodiment in accordance with the present invention;

FIG. 22 is a circuit block diagram of another example of the eighth embodiment;

DETAILED DESCRIPTION OF THE INVENTION

Figure 1:
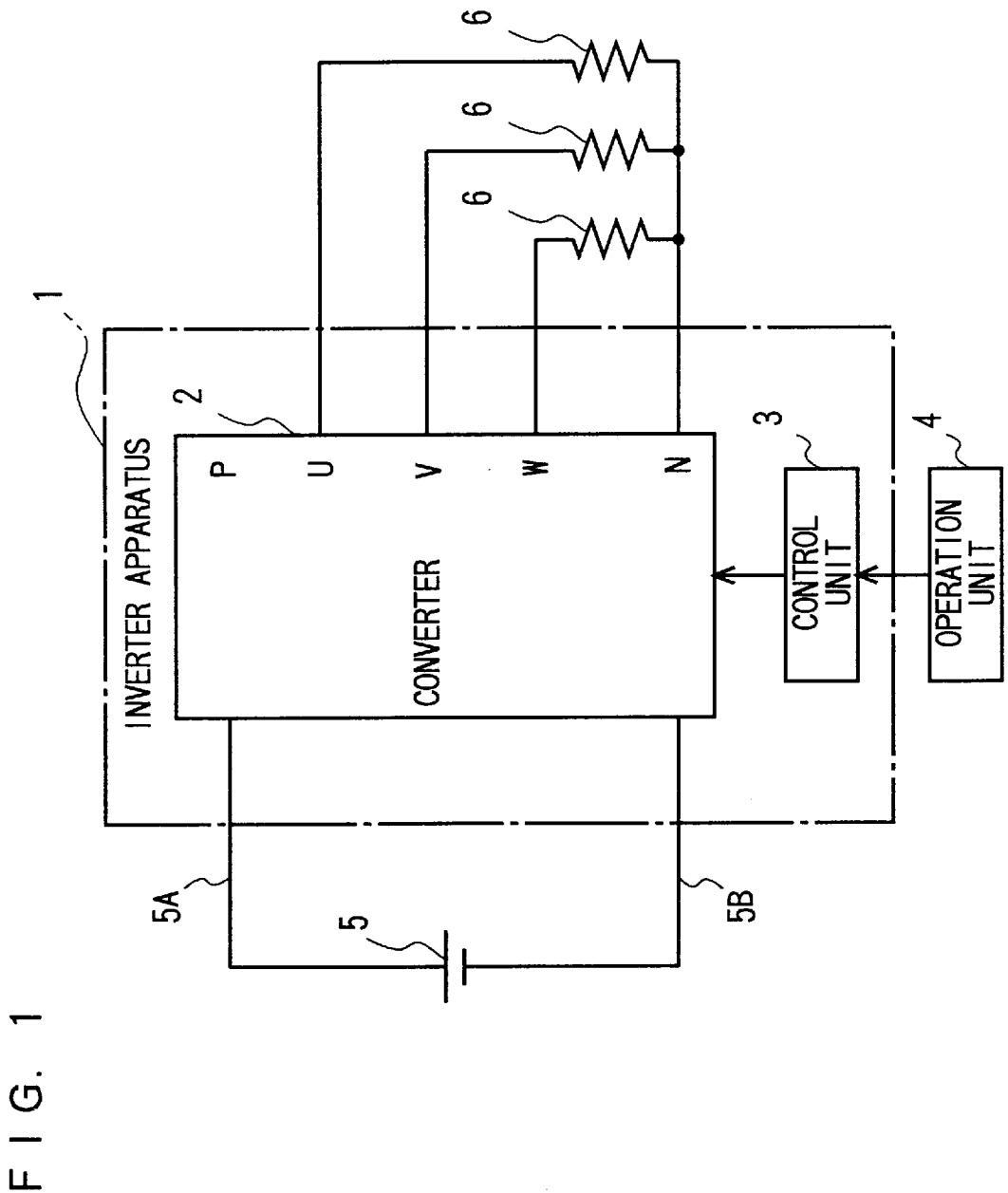
FIG. 1 is a circuit block diagram of a first embodiment of the inverter apparatus in accordance with the present invention.

Embodiments of the present invention are described below with reference to FIG. 1 to FIG. 25. The same reference numerals as those in the prior art are attached to the elements similar to those of the prior art.

FIRST EMBODIMENT

A first embodiment is described below with reference to FIG. 1 through FIG. 7. As shown in FIG. 1, an inverter apparatus 1 comprises a converter 2 and a control unit 3 as control means connected to the converter 2. The converter 2 comprises output terminals U, V and W of three phases as switching output terminals, and power source output terminals P and N. The power source output terminals P and N are connected to a positive terminal and a negative terminal of a direct current source 5, respectively. An operation unit 4 for instructing operation of the control unit 3 is connected to the control unit 3. The ends of three resistance loads 6 are connected to the output terminals U, V and W, respectively, and the other ends of three resistance loads 6 are connected in common to the power source output terminal N. First, an instruction for direct current conversion sent from the operation unit 4 is received by the control unit 3. The control unit 3 sends a signal representing the direct current conversion to the converter 2, and a current from the direct current source 5 is transmitted or interrupted by the converter 2. Consequently, currents are supplied to the resistance loads 6 from the respective terminals U, V and W of three-phases of the converter 2. The resistance loads 6 serve as heaters in an automobile, for example. The currents which have passed through the resistance loads 6 return to the power source output terminal N of the converter 2 connected to the negative terminal of the direct current source 5.

Figure 2:
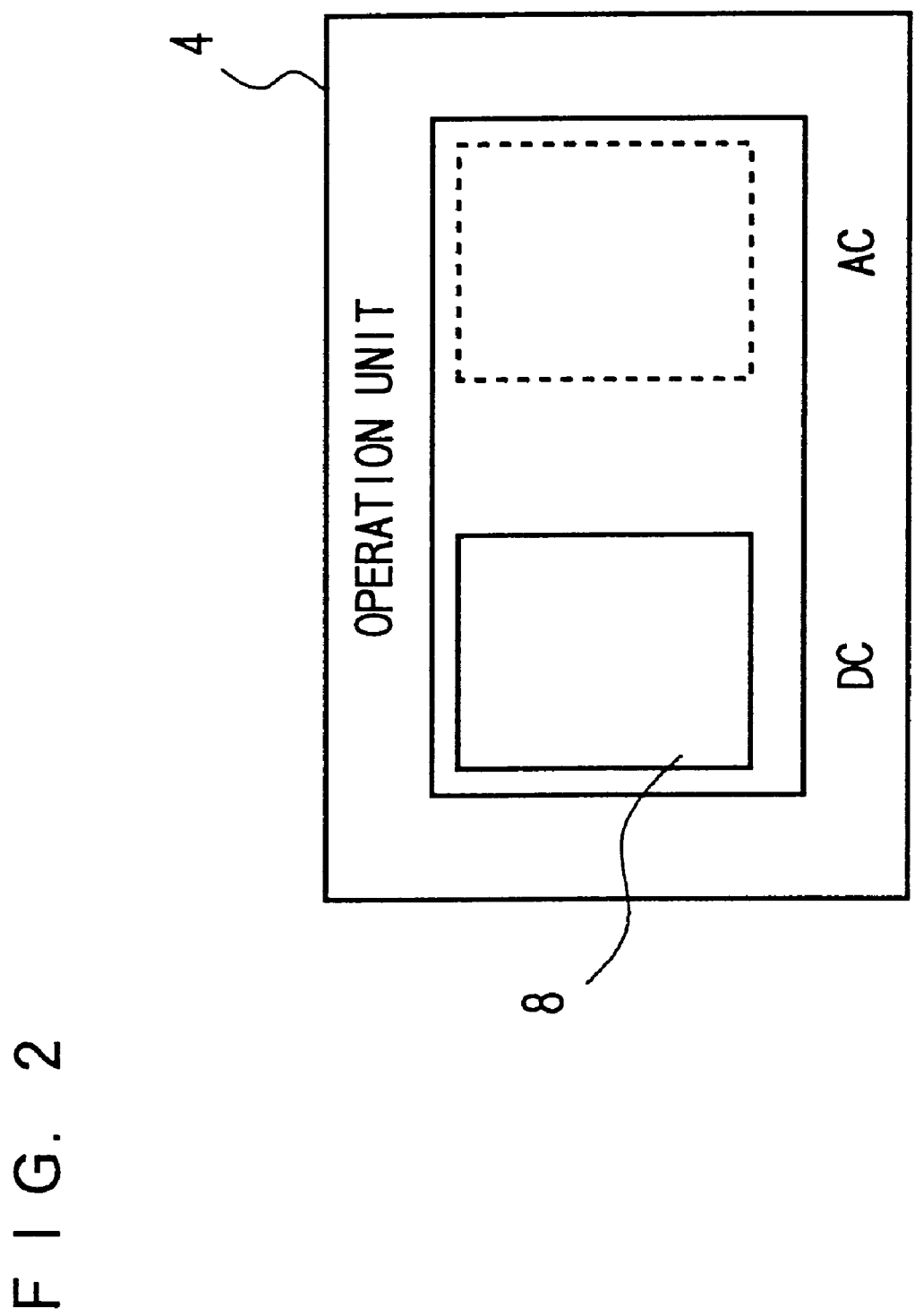
FIG. 2 is an enlarged view of an operation unit in the first embodiment.

In the operation unit 4, as shown in FIG. 2, one of direct current (DC) conversion and alternating current (AC) conversion is instructed by the position of a knob 8.

Figure 3:
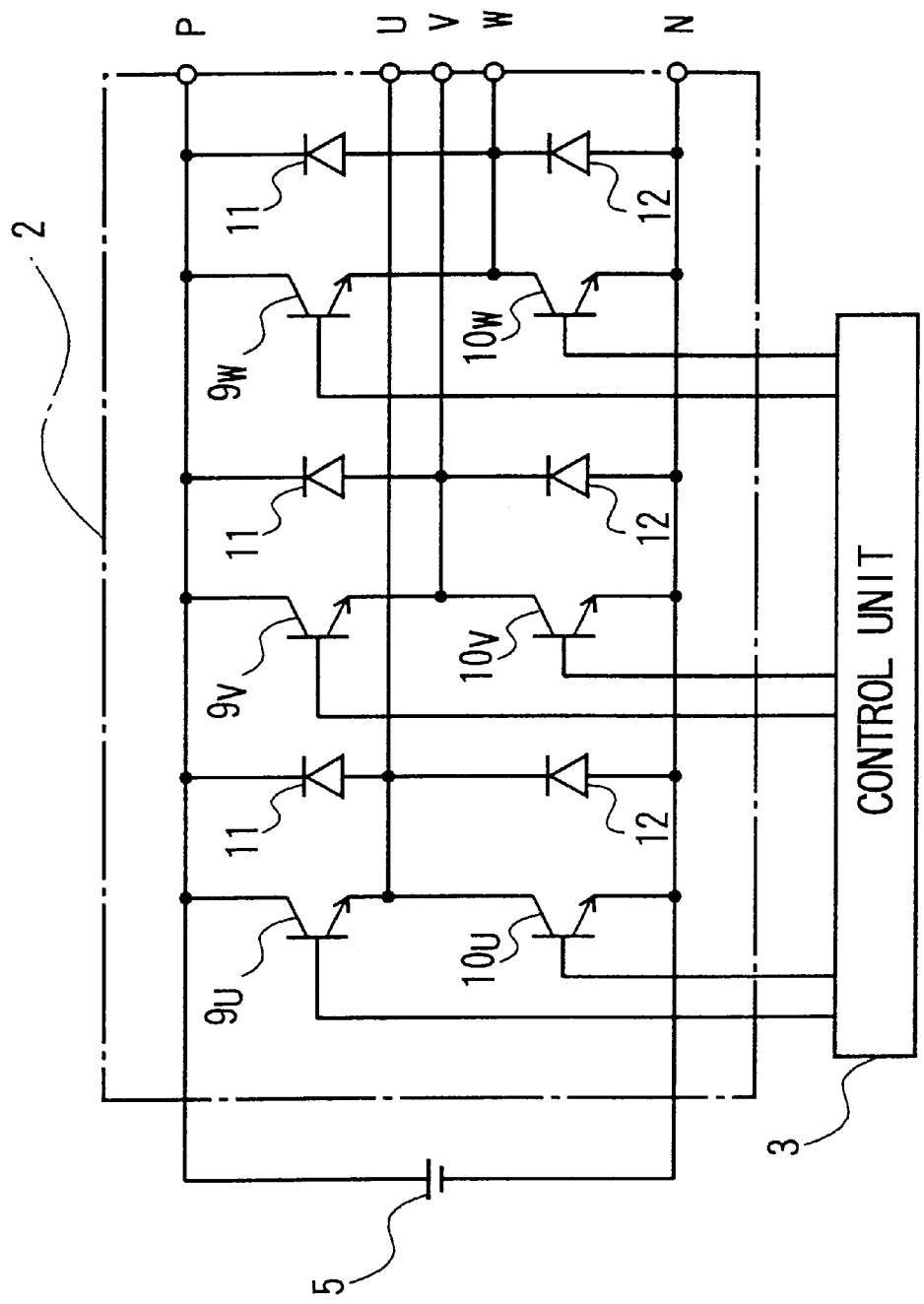
FIG. 3 is a circuit diagram of a converter in the first embodiment.
Figure 4:
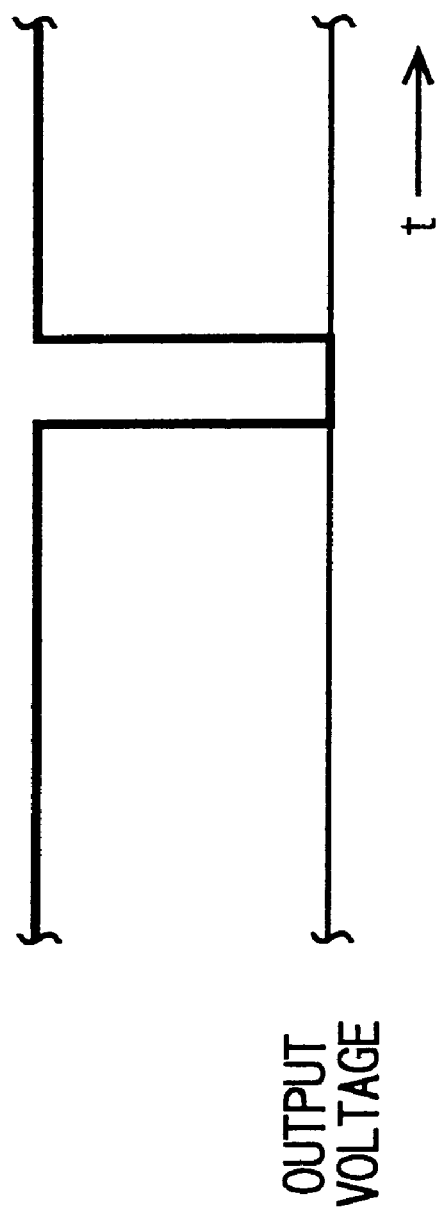
FIG. 4 is a waveform diagram of an output voltage in the first embodiment.

A circuit diagram of the converter 2 is shown in FIG. 3. Referring to FIG. 3, upper output transistors (upper switching elements) $9_U$, $9_V$, $9_W$ as output elements are connected between the power source output terminal P and the output terminals U, V, W, respectively. Moreover, lower output transistors (lower switching elements) $10_U$, $10_V$, $10_W$ are connected between the power source output terminal N and the output terminals U, V, W, respectively. An oppositely oriented upper diode 11 is connected across the collector and the emitter of each of the output transistors $9_U$, $9_V$, $9_W$. In a similar manner, an oppositely oriented lower diode 12 is connected across the collector and the emitter of each of the output transistors $10_U$, $10_V$, $10_W$. Turning ON or turning OFF of the upper transistor $9_U$, $9_V$, $9_W$ and the lower transistor $10_U$, $10_V$, $10_W$ are decided by the signals given by the control unit 3. In the case of the resistance loads 6 connected as shown in FIG. 1, only the upper output transistors $9_U$, $9_V$, $9_W$ are turned ON or turned OFF, and currents are let to flow through the resistance loads 6. The output in the direct current conversion is a direct current voltage itself, or an output voltage which is transmitted or interrupted at a low frequency of 0.1 Hz–10 Hz, for example as shown by a waveform of FIG. 4.

Figure 5:
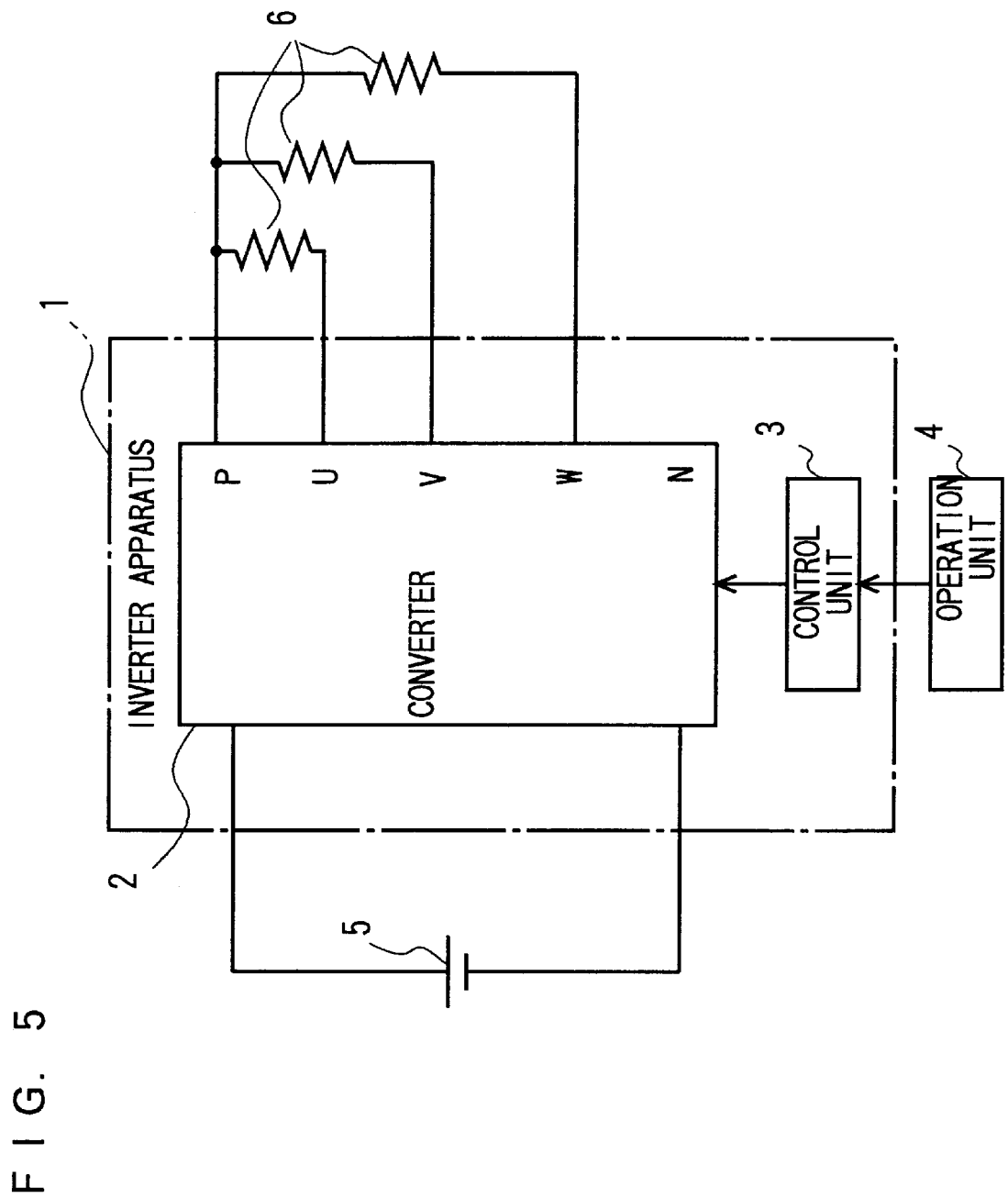
FIG. 5 is a circuit block diagram showing another example of the first embodiment.

FIG. 5 shows the case that currents are let to flow through the resistance loads 6 by turning ON or turning OFF only the lower output transistors $10_U$, $10_V$, $10_W$.

By the above-mentioned configuration, since a direct current is let to flow, it is not necessary to produce an altering current waveform as in the conventional art. Moreover, it is not necessary to use a carrier signal, therefore, generation of a harmonic current due to the carrier signal can be prevented. It is prevented that the converter 2 becomes an electric noise source or a leakage current source by outputting a direct current itself or a current which is intermitted at a low frequency.

Furthermore, in comparison with electrification from the direct current source to the resistance loads 6 by a conventional relay, durability is greatly improved because the electrification is achieved by the semiconductor switch elements.

Incidentally, in FIG. 1 and FIG. 5, even if the common connection end of the resistance loads 6 is connected to a positive line 5A or a negative line 5B of the direct current source 5 as replacement for connection to the power source output terminal P or N, the same operation as that in FIG. 1 or FIG. 5 is achieved.

Figure 6:
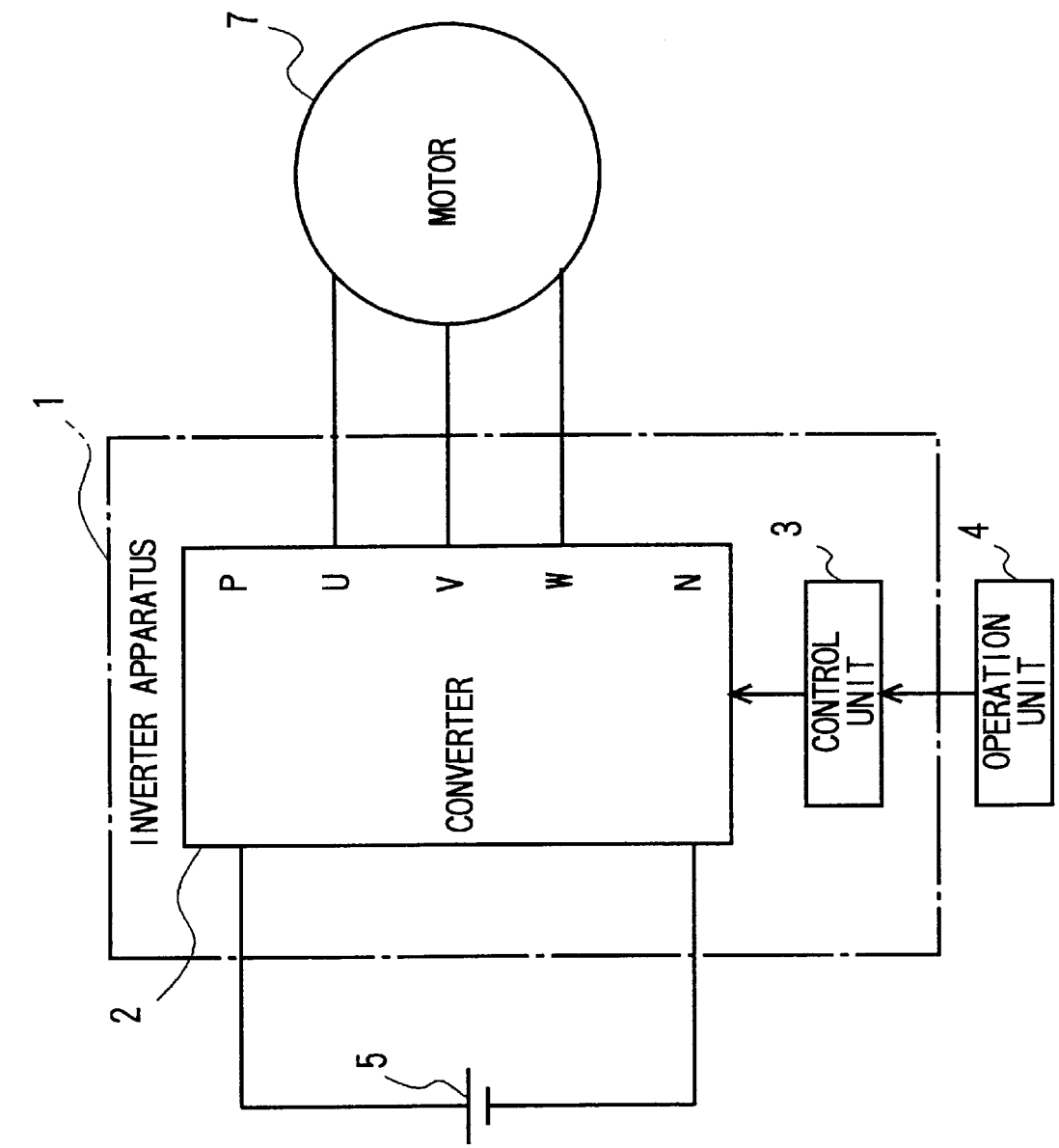
FIG. 6 is a circuit block diagram showing alternating current conversion.

FIG. 6 is a block diagram of the inverter apparatus in the case that instruction of alternating current conversion is given to the control unit 3 by the operation unit 4, and the alternating current conversion is carried out to drive a motor 7. Referring to FIG. 6, the control unit 3 transmits a signal for the alternating current conversion to the converter 2, and the current of the direct current source 5 is converted into an alternating current by the converter 2. Consequently, a three-phase alternating current is output to the three-phase output terminals U, V and W. The three-phase alternating current is supplied to the motor 7 connected to the output terminals U, V, W. The motor 7 is rotated by the three-phase alternating current.

Figure 7:
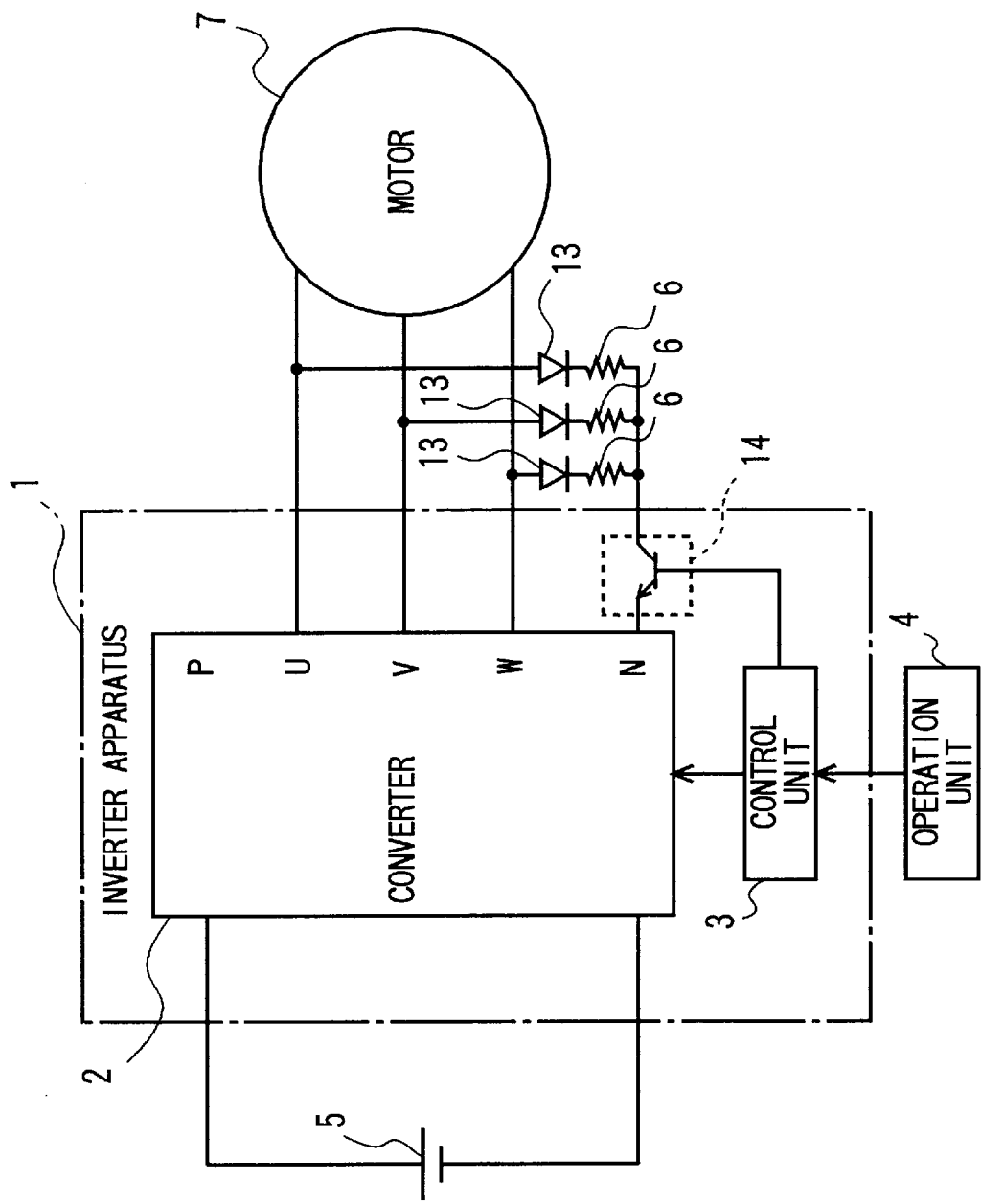
FIG. 7 is a circuit block diagram showing the alternating current conversion and direct current conversion.

FIG. 7 is a circuit block diagram in the case that the resistance loads 6 are connected to the circuit shown in FIG. 6. Referring to FIG. 7, the anode of a diode 13 is connected to each of the output terminals U, V and W of the converter 2. One end of the resistance load 6 is connected to the cathode of each diode 13. The other ends of the resistance loads 6 are connected in common to the collector of a transistor 14. The emitter of the transistor 14 is connected to the power source output terminal N. The base of the transistor 14 is connected to the control unit 3. Direct currents are supplied to the resistance loads 6 through the respective diodes 13 by the above-mentioned circuit configuration. When instruction for alternating current conversion is applied to the control unit 3 from the operation unit 4, the control unit 3 transmits a signal for alternating current conversion to the converter 2. Simultaneously, a signal is given to the base of the transistor 14 from the control unit 3, and the transistor 14 turns ON. The converter 2 converts the current of the direct current source 5 to an alternating current, and outputs the alternating current to the motor 7 through the output terminals U, V, W. The alternating current at the output terminals U, V, W are rectified by the respective diodes 13, and the rectified currents pass through the resistance loads 6 when the upper output transistors $9_U$, $9_V$, $9_W$ turn ON. Consequently, the alternating currents are supplied to the motor 7, and the direct current can also be supplied to the resistance loads 6. Incidentally, the series-connected diodes 13 and resistance loads 6 can be connected across the output terminals U, V, W and the power source output terminal P through the transistor 14. In this case, the diodes 13 and the transistor 14 are connected to the power source output terminal P in the forward direction. The transistor 14 which serves as a switch in the direct current conversion has a higher durability than a relay.

According to the first embodiment, the inverter 1 can drive the motor 7 by supplying the alternating current, and also can supply the direct current itself or a low frequency alternating current of various waveforms by changing operations of the output transistors $9_U$, $9_V$, $9_W$, $10_U$, $10_V$, $10_W$ in response to the output signals of the control unit 3.

SECOND EMBODIMENT

Figure 8:
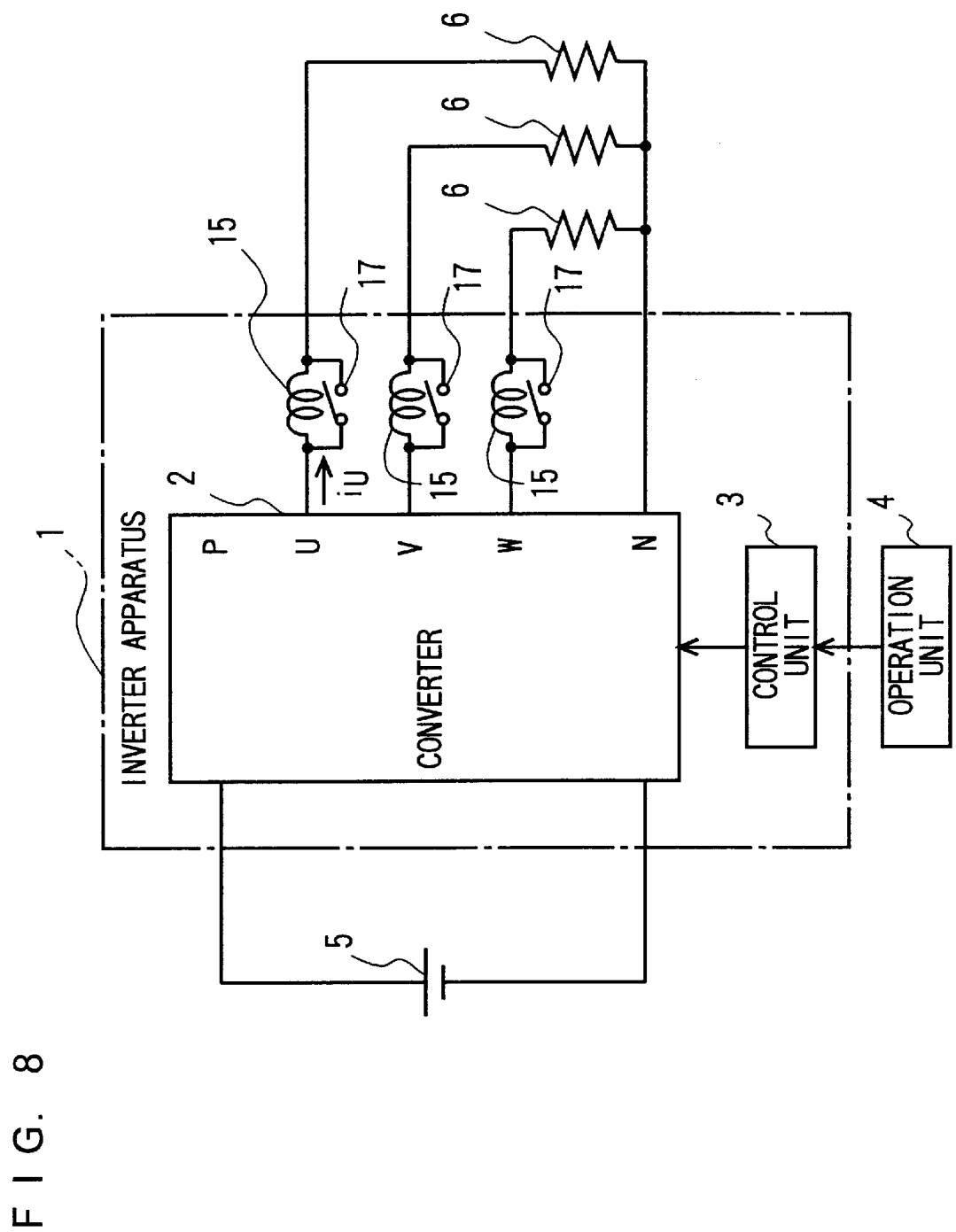
FIG. 8 is a circuit block diagram of a second embodiment of the inverter apparatus in accordance with the present invention.

A second embodiment is described with reference to FIG. 8 to FIG. 11. FIG. 8 is a circuit block diagram in the case that series connected resistance load 6 and coil 15 for filtering current is connected across each of the output terminals U, V, W and the power source output terminal N. A relay switch 17 is coupled in parallel to each coil 15. FIG. 10 shows a waveform diagram of a voltage across the output terminal U and the power source output terminal N in FIG. 8, and a waveform diagram of a current $i_U$ of the output terminal U. Waveforms of a voltage $V_R$ and a current $i_R$ of the resistance load 6 are similar to that of the current $i_U$. In FIG. 10, a peak voltage across the output terminal U and the power source output terminal N is lowered by the coil 15.

Figure 9:
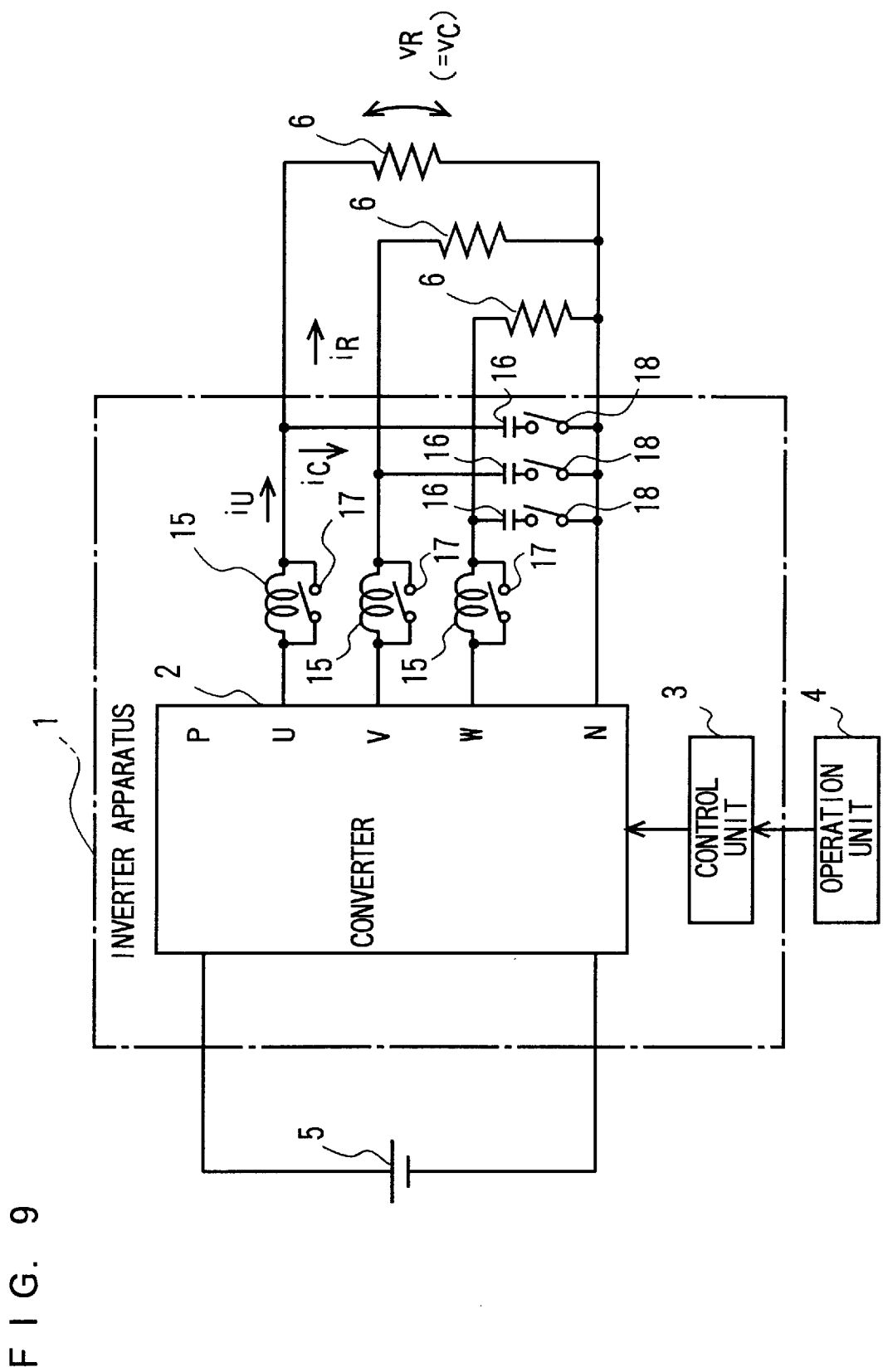
FIG. 9 is a circuit block diagram showing another example of the second embodiment.
Figure 10:
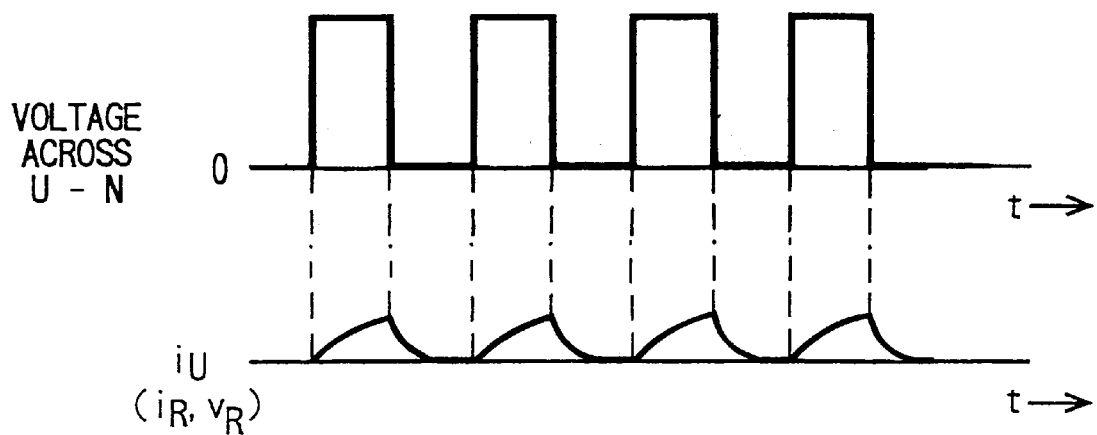
FIG. 10 is a timing chart of an output voltage and an output current in the second embodiment.
Figure 11:
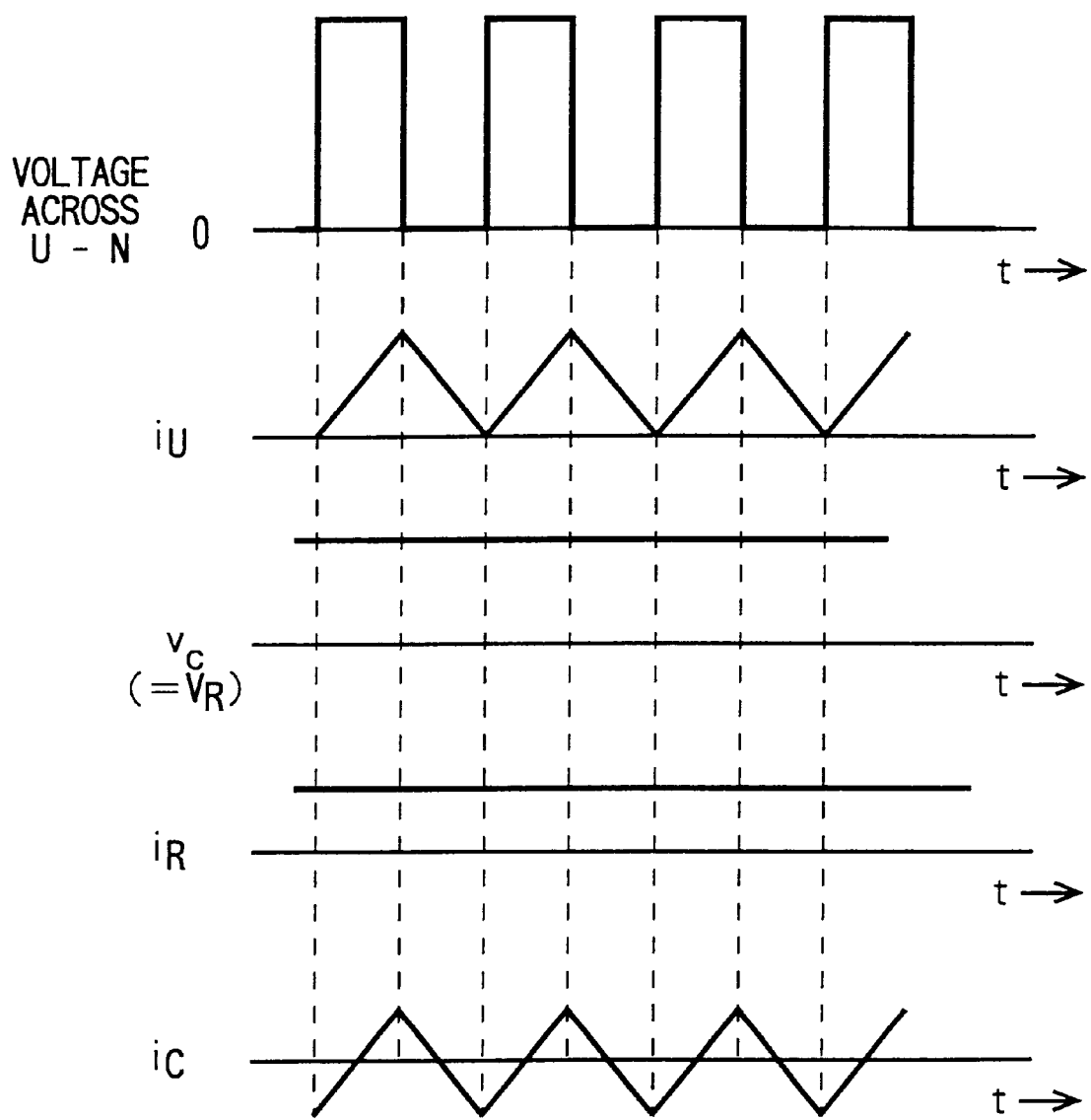
FIG. 11 is a timing chart showing operation of another example in the second embodiment.

FIG. 9 is a circuit diagram in the case that series connected capacitor 16 and relay switch 18 is coupled in parallel with each resistance load 16. FIG. 11 shows waveform diagrams of voltages and currents in the circuit of FIG. 9. Referring to FIG. 11, a voltage across the output terminal U and the power source output terminal N has a square waveform. A current $i_U$ passing through the output terminal U and a current $i_C$ passing through the capacitor 16 have triangular waveforms. A voltage $V_R$ across both ends of the resistance load 6 and a current $i_R$ passing through the resistance load 6 have respective constant values. A peak voltage applied to the resistance load 6 is reduced by connecting the capacitor 16, and a low voltage direct current is output. Incidentally, a gradually decreasing current $i_U$ in the period of zero of the voltage across the output terminal U and the power source output terminal N is caused by a current passing through the lower diode 12 in FIG. 3 and the coil 15. Moreover, in such alternating current conversion in which alternating current equipments are connected as replacements for the resistance loads 6, the relay switches 17 are closed, and the relay switches 18 are opened.

As mentioned above, a peak voltage is suppressed and the output voltage can be lowered. Therefore, it is not necessary to select a load which has a higher withstand voltage than the voltage of the direct current source. Safety is maintained by lowering the voltage.

THIRD EMBODIMENT

A third embodiment of the present invention is described with reference to FIG. 12 and FIG. 13.

FIG. 12 shows waveform diagrams of output voltages in the case that frequencies and duty ratios of the output voltages at the output terminals U, V and W of three-phase are independently changed. Referring to FIG. 12, the output voltages $v_{U-N}$, $v_{V-N}$ and $v_{W-N}$ across the respective output terminals U and N, V and N, and W and N are different in output time lengths and output timings with each other. In order to change the output time lengths and the output timings, the control signals applied to the output transistors $9_U$, $9_V$, $9_W$, $10_U$, $10_V$, $10_W$ from the control unit 3 are individually changed. The third embodiment is applied to the case that the plural resistance loads 6 in FIG. 9 individually serve as different functions. For example, in FIG. 13, an automobile 19 is provided with an electric heater 20 for air conditioner, an electric heater 21 for warming a seat and a heating wire 22 for heating a rear window. An electric power instructed by an electric heater adjuster 23 for air-conditioning is supplied to the electric heater 20. An electric power instructed by a heater adjuster 24 for seat-heating is supplied to the electric heater 21. An electric power instructed by a heater adjuster 25 for the heating wire is supplied to the heating wire 22. Incidentally, a fan 26 serves as an air conditioning fan.

As described above, the inverter apparatus of the present invention is capable of supplying separate outputs to separate loads, and controlling simultaneously many kinds of load.

FOURTH EMBODIMENT

A fourth embodiment is described with reference to FIG. 14 and FIG. 15. FIG. 14 shows waveform diagrams representing a control state in which the output voltages $v_{U-N}$, $v_{V-N}$ and $v_{W-N}$ at the respective output terminals U, V and W of three-phase do not overlap in time scale.

Figure 15:
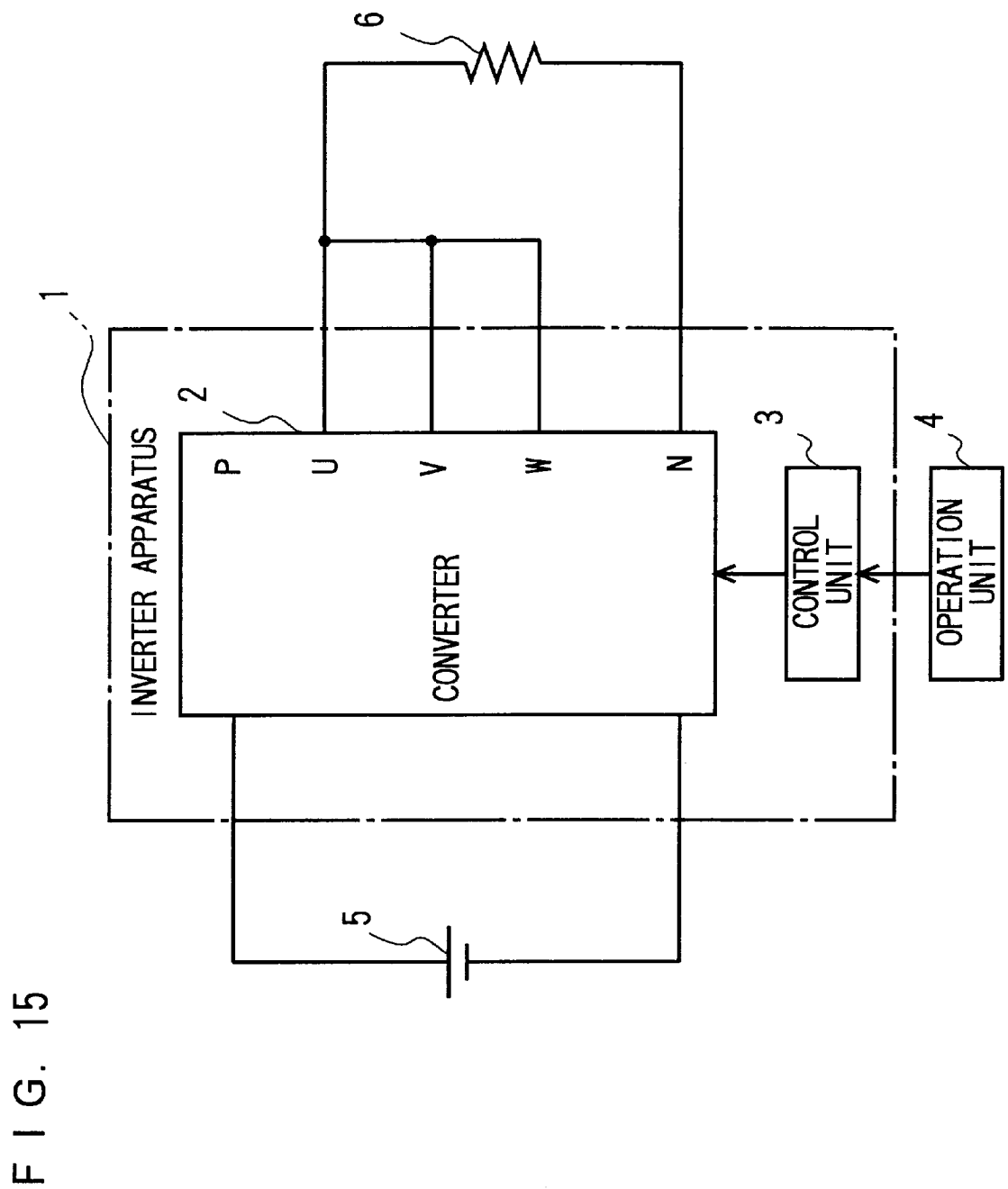
FIG. 15 is a circuit block diagram of the fourth embodiment of the inverter apparatus.

FIG. 15 is a circuit block diagram of which the three-phase output terminals U, V and W are connected to one and applied to one resistance load 6 in the control state shown in FIG. 14. In FIG. 14, a waveform diagram $V_R$ represents an output voltage applied to the resistance load 6 in FIG. 15.

According to this configuration, the voltage applied to the resistance load 6 is continuous in time scale, and consequently, a large electric power is supplied to the resistance load 6. In the configuration of FIG. 15, since the upper output transistors $9_U$, $9_V$, $9_W$ of the converter 2 in FIG. 3 pass a current in time-sharing manner, a burden imposed on each upper output transistor is reduced to one third. Therefore, a large electric power can be supplied with suppression of the burden of each phase by connecting all phases to a particular load and supplying an electric power to each phase in turn.

FIFTH EMBODIMENT

Figure 16:
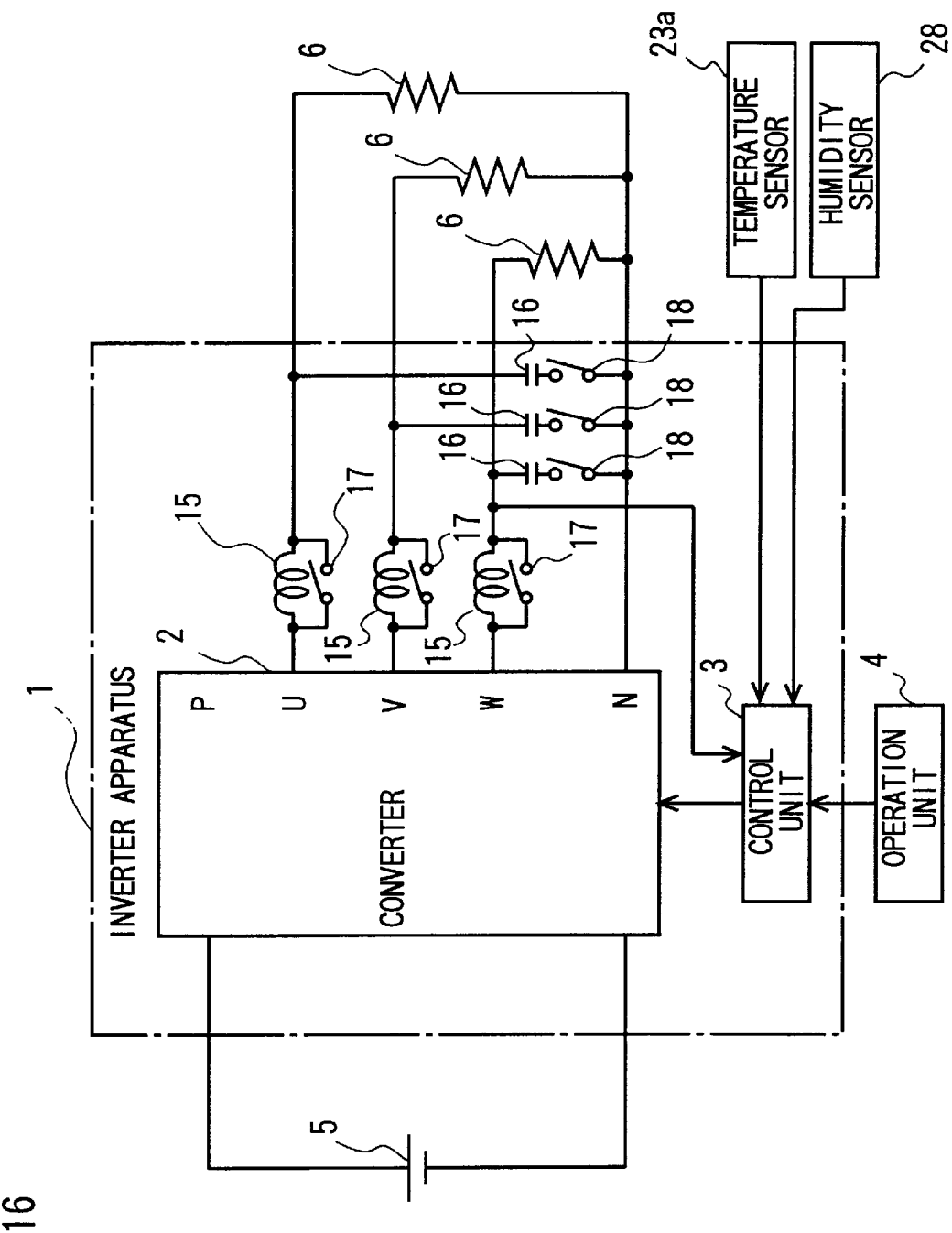
FIG. 16 is a circuit block diagram of a fifth embodiment of the inverter apparatus in accordance with the present invention.
Figure 17:
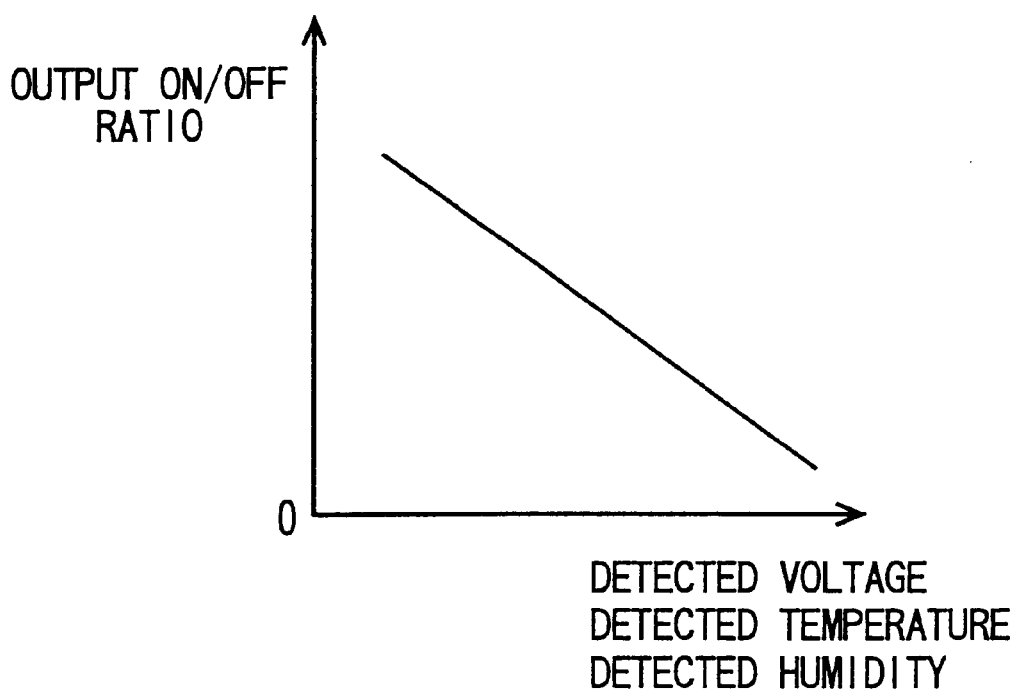
FIG. 17 is a graph illustrating action in the fifth embodiment.

A fifth embodiment is described with reference to FIG. 16 and FIG. 17. In the circuit shown in FIG. 16, a pair of serially-coupled capacitor 16 and switch 18 is connected in parallel with each resistance load 6. When the switches 18 are closed, the capacitors 16 are connected to the respective resistance loads 6, and the outputs of the three phase output terminals U, V, W are effectively filtered. The filtered voltage of the output terminal W is applied to the control unit 3 and detected thereby. Then, output ON-OFF ratios of the upper output transistors $9_U$, $9_V$, $9_W$ are controlled on the basis of the detected voltage of the control unit 3 as shown in FIG. 17. As a result, the output voltage of the output terminals U, V, W are held to predetermined voltages. Therefore, stable voltages or electric powers can be usually supplied to the loads.

SIXTH EMBODIMENT

A sixth embodiment is described with reference to FIG. 18. FIG. 18 is a cross-sectional view of a ventilation unit 40 of an air conditioner. A refrigerator 27 of the ventilation unit 40 is coupled to an air conditioning compressor (not shown) driven by the motor 7 shown in FIG. 6. Air in the ventilation unit 40 is cooled and dehumidified by the refrigerator 27, and is reheated by an air conditioning electric heater 20 corresponding to the resistance load 6. A humidity of ventilated air by an air-conditioning fan 26 is detected by a humidity sensor 28. A detected value of the humidity sensor 28 is inputted to the control unit 3, and as shown in FIG. 17, an output voltage of the control unit 3 is controlled by selecting the output ON-OFF ratio corresponding to the detected humidity. Consequently, the room of an automobile is kept to a constant humidity. In the case of temperature control, in FIG. 13, the electric heater adjuster 23, the heater adjuster 24 and the heater adjuster 25 for heating the rear window are replaced with an electric heater temperature sensor 23a, a heater temperature sensor 24a and a temperature sensor 25a, respectively, and thereby temperatures are measured. For example, in the circuit shown by FIG. 16, the humidity sensor 28 and the temperature sensor 23a are connected to the control unit 3, By the above-mentioned configuration, the temperature and humidity can be stably controlled.

SEVENTH EMBODIMENT

Figure 19:
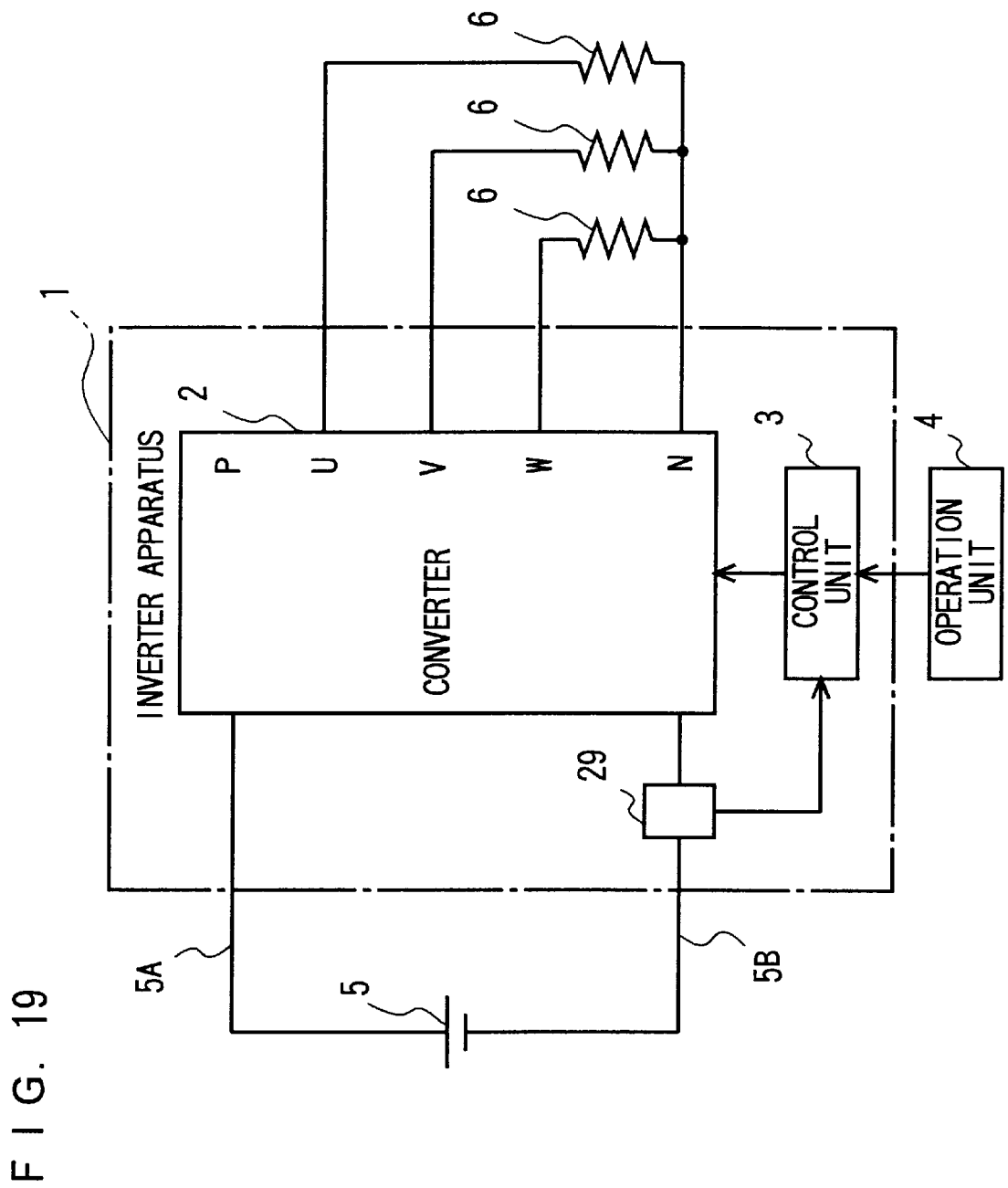
FIG. 19 is a circuit block diagram of a seventh embodiment of the inverter apparatus in accordance with the present invention.
Figure 20:
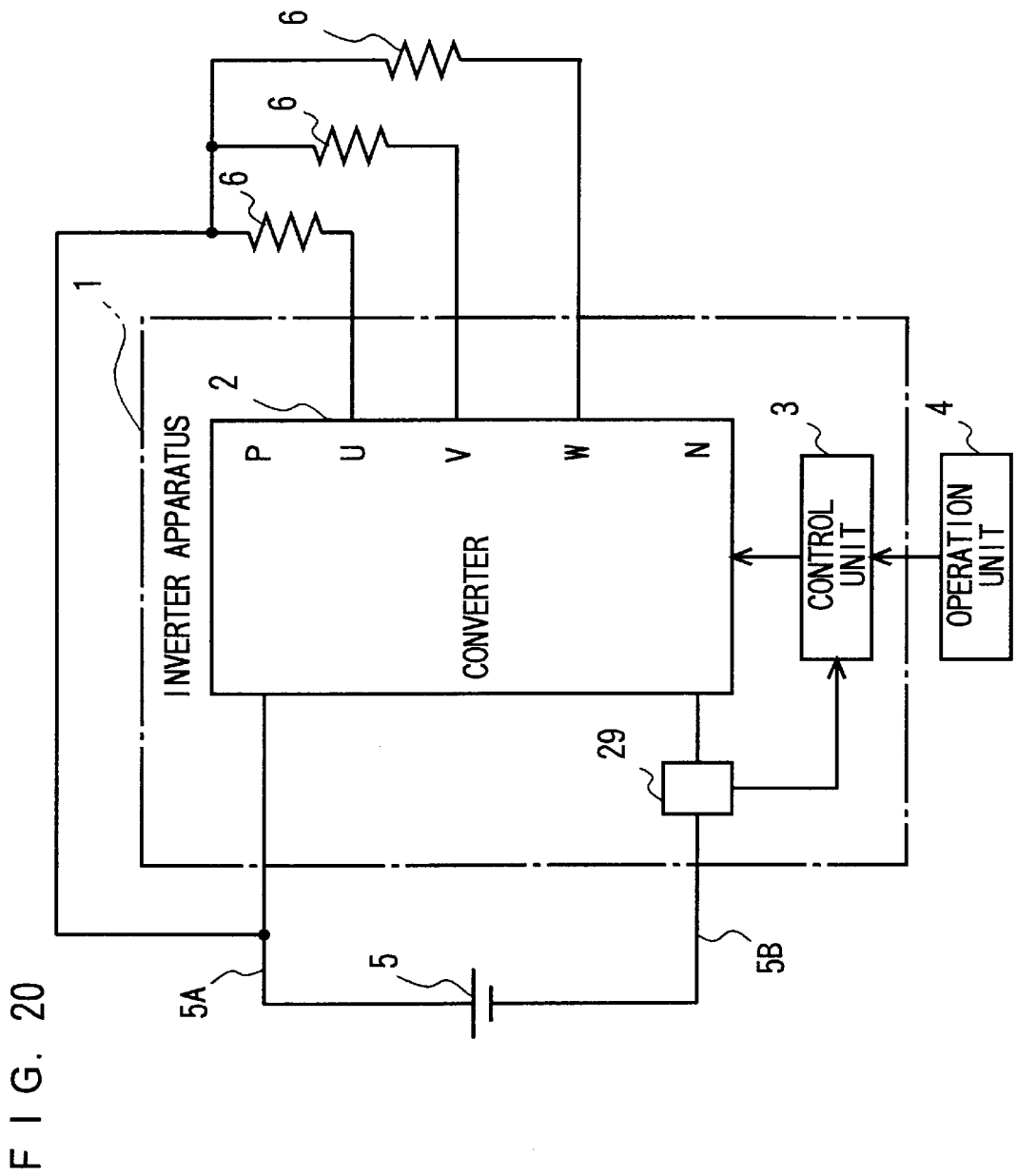
FIG. 20 is a circuit block diagram showing another example of the seventh embodiment.

A seventh embodiment is described with reference to FIG. 19 and FIG. 20. FIG. 19 is a block diagram of the inverter apparatus 1 of which a current of the resistance load 6 is measured by a current sensor 29 disposed on the negative line 5B of the direct current source 5. In FIG. 19, the common terminal of the resistance loads 6 is connected to the output terminal N. In the case that the common terminal of the resistance loads 6 is connected to the output terminal P, the current sensor 29 is disposed on the positive line 5A of the direct current source 5. In FIG. 20, the common terminal of the resistance loads 6 is not connected to the terminal P but directly connected to the positive line 5A of the direct current source 5. In this case, the current can be measured. An excessive load applied to the resistance load 6 or the motor 7 is detected by the current sensor 29, and overloaded operation can be prevented. Therefore, it is not necessary to mount a particular current sensor for detecting the direct current on the direct current source 5, and the direct current source 5 is reduced in size and cost.

EIGHTH EMBODIMENT

An eighth embodiment of the present invention is described with reference to FIG. 21 to FIG. 24. FIG. 21 is a block diagram of the inverter apparatus comprising a switch 30 which connects either the motor 7 or delta-connected resistance loads 6 to the converter 2. FIG. 22 is a block diagram of the inverter apparatus comprising a switch 30 which is activated in correspondence with switching operation between the state of alternating current conversion and the state of direct current conversion being controlled by the control unit 3. Switching operation of the switch 30 is carried out at the time when the alternating current output or the direct current output falls to zero for a predetermined time period being controlled by a signal of the control unit 3 and currents do not flow through the switch 30. Therefore, it is not necessary to provide countermeasure against arc or surge on the switch 30. A small sized switch is usable to the switch 30, for example, a relay for mounting on a printed circuit board is also usable. Therefore, the switch 30 can be included in the invertor apparatus 1.

In the case that the switch 30 is the relay, the relay having a small contact capacity which can cope with an output current is usable. In the case of a semiconductor switch, the semiconductor switch having a small withstand voltage which can cope with an output voltage is usable. Consequently, the inverter apparatus can be miniaturized, moreover, durability of the relay does not depend on electrical life (about fifty thousand times) but depend on mechanical life (about one million times) because the arc or the surge does not occur.

Figure 24:
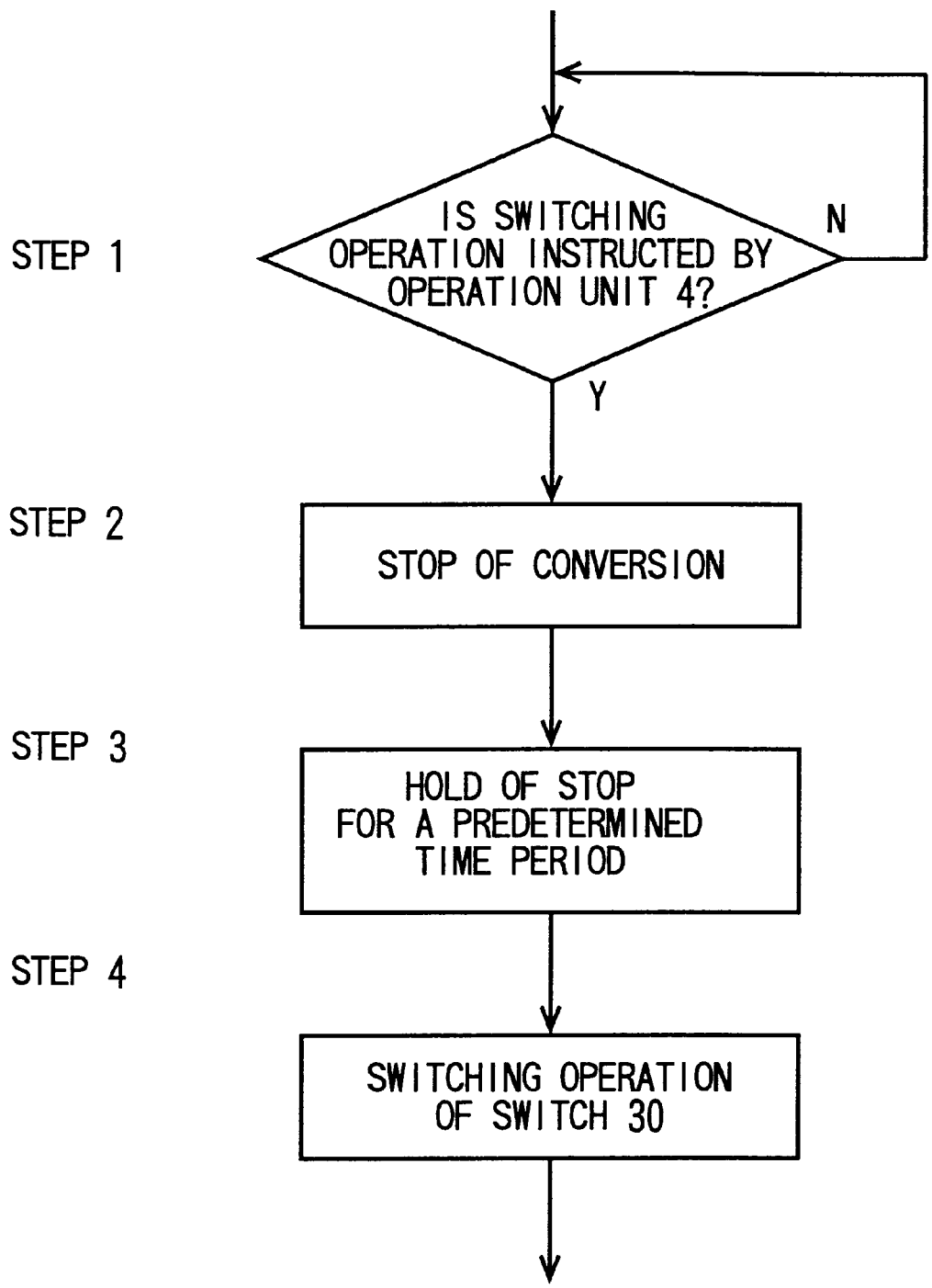
FIG. 24 is a flow chart illustrating operation of the eighth embodiment.

FIG. 24 is a flowchart of operation of the switch 30 shown in FIG. 21 and FIG. 22. At step 1, it is examined that switching operation is instructed by the operation unit 4. When the switching operation is instructed by the operation unit 4, conversion operation in the converter 2 is stopped at step 2, and the stop of the conversion operation is held for a predetermined time period at step 3. The switching operation of the switch 30 is carried out after the stop of the conversion operation at step 4. After completion of the switching operation of the switch 30, the conversion operation of the converter 2 is reopened. Therefore, generation of arc or surge in the switching operation is surely prevented by the operations at steps 2 to 4, and reliability can be improved.

Figure 23:
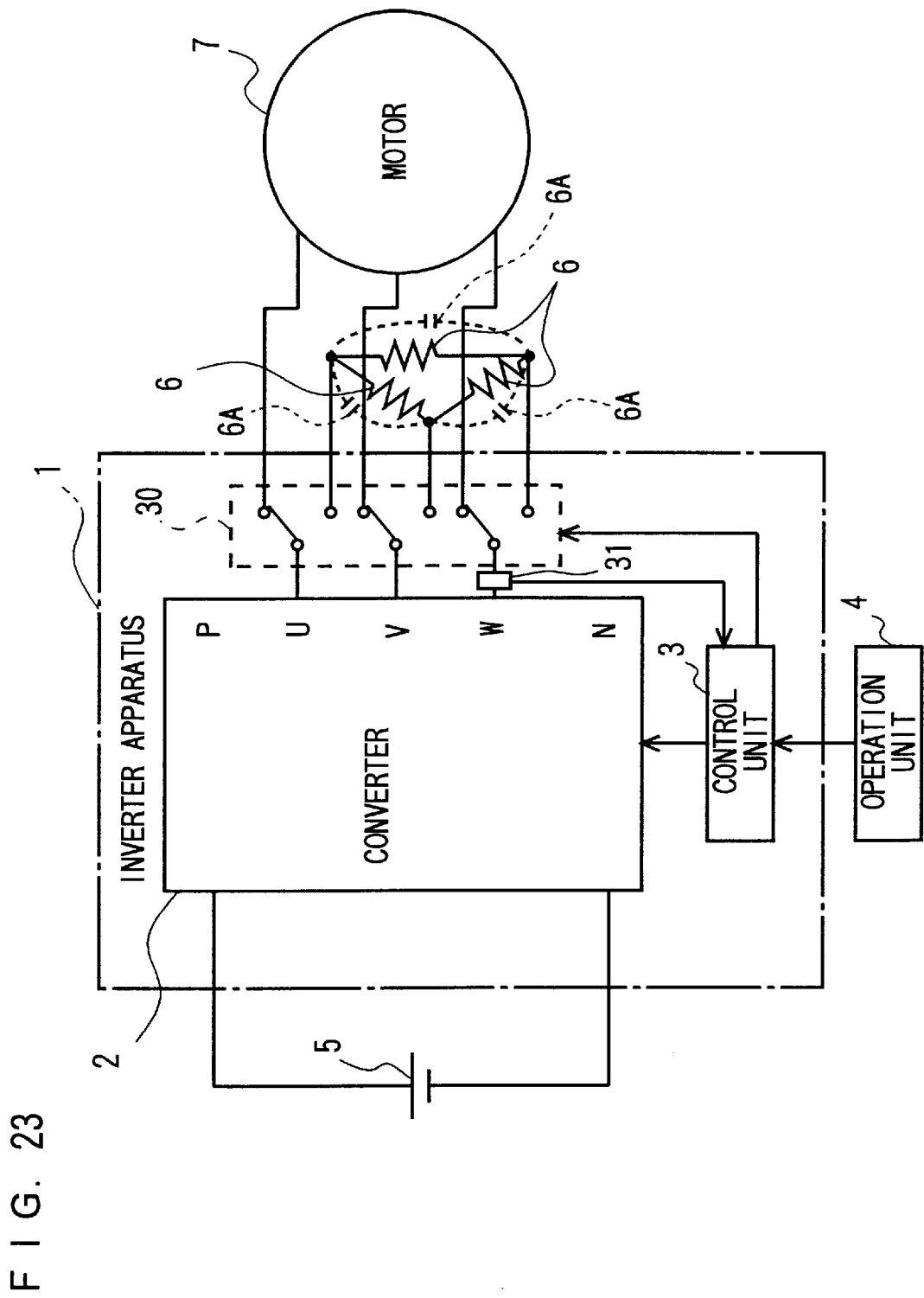
FIG. 23 is a circuit block diagram of further example of the eighth embodiment.
Figure 25:
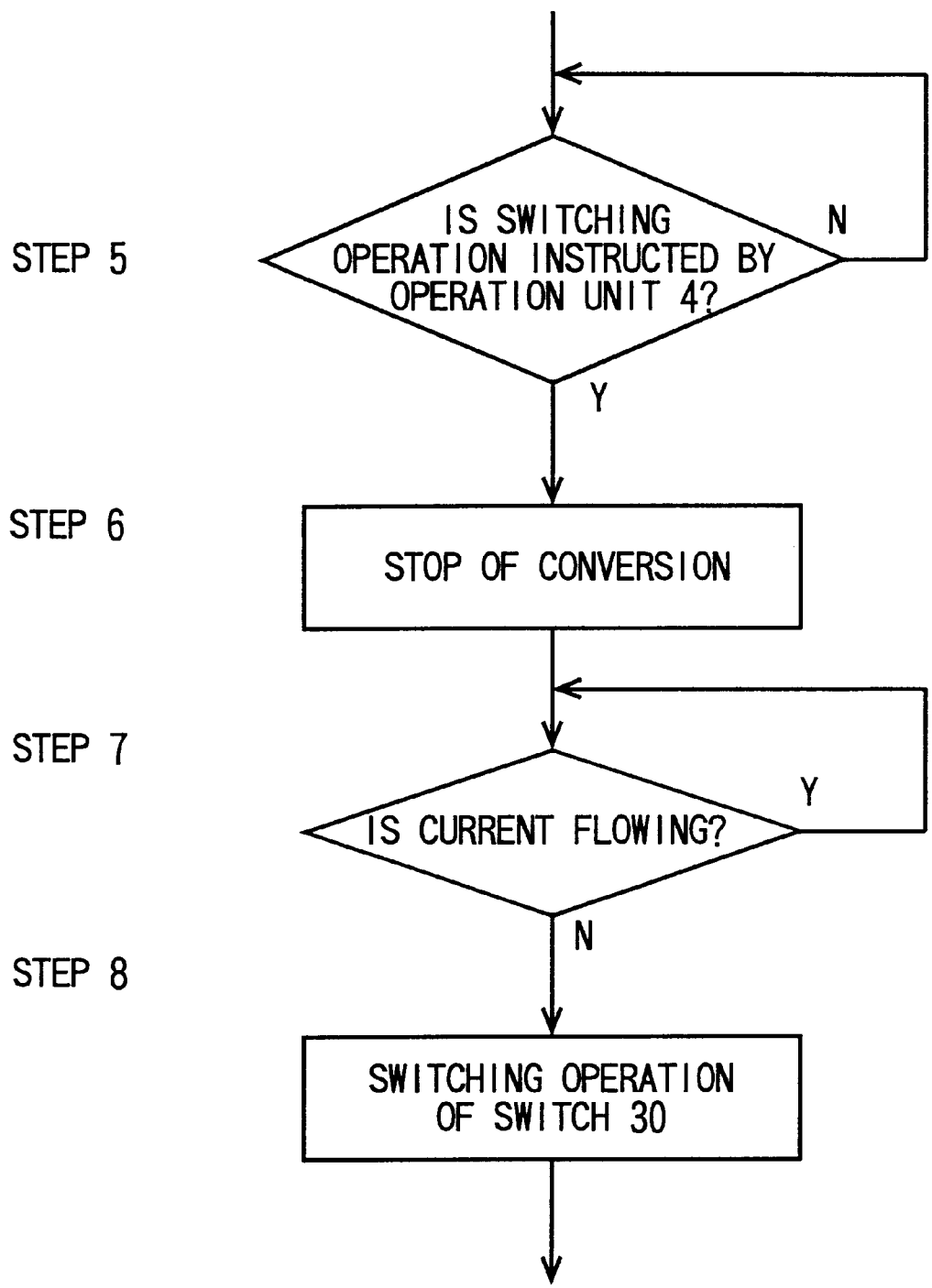
FIG. 25 is a flow chart illustrating operation of the other example of the eighth embodiment.
Figure 26:
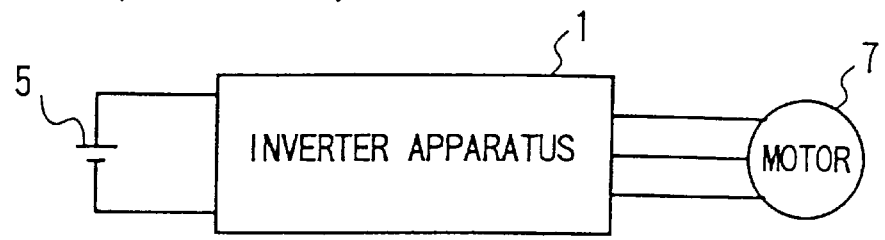
FIG. 26 is the circuit block diagram of the inverter apparatus in the prior art.
Figure 27:
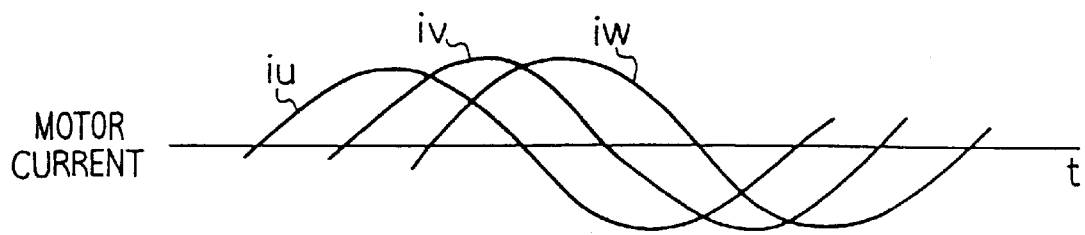
FIG. 27 is the waveform diagram of the currents of the motor in the prior art.
Figure 28:
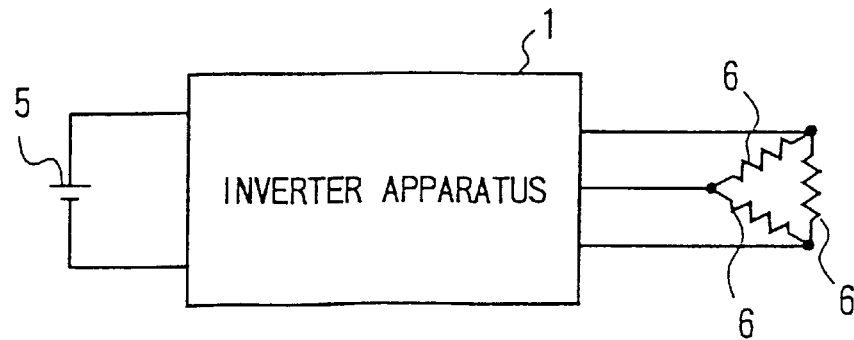
FIG. 28 is the circuit block diagram of the other example of the prior art.
Figure 29:
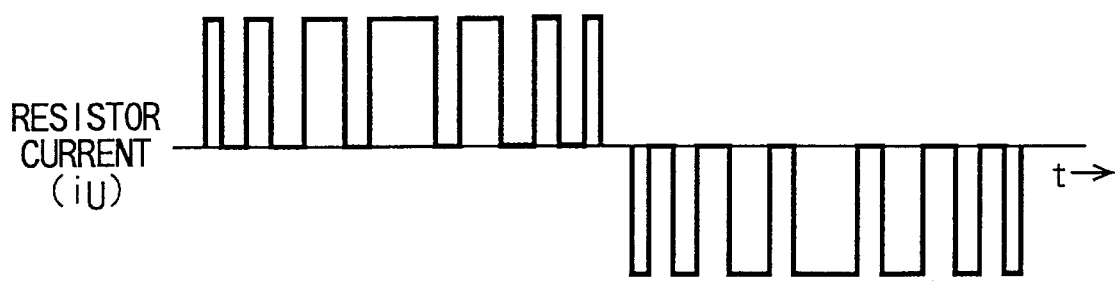
FIG. 29 is the waveform of the current of the resistor in FIG. 28.
Figure 30:
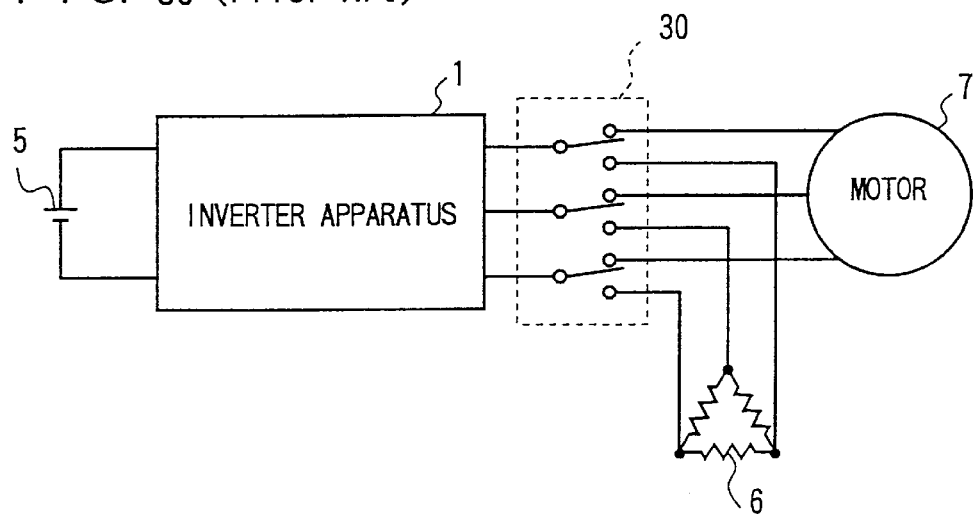
FIG. 30 is the circuit block diagram of the further example of the prior art.

FIG. 23 is a block diagram of the inverter apparatus comprising a current sensor 31 between the converter 2 and the switch 30 in the eighth embodiment. In the case that the resistance loads 6 have parasitic capacitors 6A, even if the output current of the converter 2 falls to zero by control of the control unit 3, a current is liable to flow for a short time period due to the parasitic capacitors 6A. The current sensor 31 detects the current due to the parasitic capacitors 6A and an output signal of the current sensor 31 is inputted to the control unit 3. The control unit 3 switches the switch 30 after the detected current of the current sensor 31 has fallen to zero. FIG. 25 is a flowchart of operation of the switch 30 in FIG. 23.

At step 5, presence or absence of instruction of switching operation is examined. If it is present, conversion operation of the converter 2 is stopped at step 6, and a current is detected by the current sensor 31 at step 7. If the current is absent, switching operation is carried out at step 8. Incidentally, the current sensor 31 can be arranged at other part than that shown in FIG. 23 in a manner similar to the current sensor 29 in FIG. 19 and FIG. 20.

By the above-mentioned configuration, generation of arc or surge during switching operation is surely prevented in a similar manner to the previous embodiments.

Incidentally, although descriptions are made as to three-phase converter 2 in the above mentioned embodiments, the present invention is not limited to the three-phase converter.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. An inverter apparatus comprising:
    a plurality of switching element pairs which include serially-coupled upper switching and lower switching elements, wherein each upper switching element is connected to a positive side of a direct current source, and each lower switching element is connected to a negative side of said direct current source,
    a plurality of switching output terminals connected to junctions between said upper switching elements and lower switching elements,
    a power source output terminal connected to one of the positive side and the negative side of said direct current source, and
    control means for controlling operations of said upper switching elements and said lower switching elements so as to operate in at least a first mode and a second mode, wherein:
        the first mode supplies an alternating current to a motor connected across said plurality of switching output terminals, and
        the second mode supplies a direct current through a resistance load connected across said power source output terminal and one of said plurality of switching output terminals.

2. An inverter apparatus in accordance with claim 1, wherein
    in the second mode, said control means operates said upper switching elements and lower switching elements differently from how said control means operates said upper switching elements and lower switching elements in the first mode.

3. An inverter apparatus in accordance with claim 1, further comprising
    a filter circuit for filtering a current, wherein the filter circuit includes an element having at least an inductance component, and wherein the element is disposed in a path passing the direct current through said resistance load connected across said power source output terminal and one of said plurality of switching output terminals.

4. An inverter apparatus in accordance with claim 2, wherein
    in the second mode, said control means controls operations of said upper switching elements and lower switching elements so that each of the plurality of switching output terminals acts independently from any other of the plurality of switching output terminals.

5. An inverter apparatus in accordance with claim 2, wherein
    in the second mode, said control means controls operations of said upper switching elements and lower switching elements so that outputs at the plurality of switching output terminals do not overlap with each other in time so that only one of the plurality of switching output terminals sources direct current at a time.

6. An inverter apparatus in accordance with claim 2, wherein
    in the second mode, said control means further comprises a voltage detection function which detects a detected voltage of the resistance load through which the direct current passes, compares said detected voltage with a predetermined voltage and controls operations of said upper switching elements and lower switching elements so that said detected voltage of said resistance load becomes equal to the predetermined voltage.

7. An inverter apparatus in accordance with claim 2, wherein in the second mode said control means
further comprises at least one of a temperature sensor and a humidity sensor,
detects at least one of a first temperature value and a first humidity value at a predetermined position, wherein the first temperature and first humidity values are adjusted by said resistance load through which the direct current passes,
compares at least one of the first temperature value and the first humidity value with at least one of a predetermined temperature and a predetermined humidity, and
controls operations of said upper switching elements and said lower switching elements so that at least one of said first temperature value and first humidity value at the predetermined position becomes equal to its respective predetermined temperature or humidity.

8. An inverter apparatus in accordance with claim 1, further comprising
a current sensor for measuring a current passing through the motor is disposed in a circuit passing the direct current through the resistance load, while operating in the second mode.

9. An inverter apparatus in accordance with claim 1, wherein the resistance load is an electric heater.

10. An inverter apparatus comprising:
a plurality of switching element pairs which include serially-coupled upper switching and lower switching elements, wherein each upper switching element is connected to a positive side of a direct current source, and each lower switching element is connected to a negative side of said direct current source,
a plurality of switching output terminals for connecting the junctions of said upper switching elements and said lower switching elements to at least one of a plurality of loads and a motor,
control means for controlling operations of said upper switching elements and said lower switching elements for supplying an alternating current to the motor connected across said plurality of switching output terminals, and
switching means for selectively connecting the junctions of said upper switching elements and said lower switching elements to at least one of the plurality of loads and the motor,
said switching means being controlled by said control means so that selective connecting of the junctions is performed while a current does not pass through said switching means.

11. An inverter apparatus in accordance with claim 10, wherein
said switching means is controlled by said control means so that selective connecting of the junctions is performed a predetermined time period after suspension of operations of said upper switching elements and said lower switching elements.

12. An inverter apparatus in accordance with claim 10, wherein
said converter comprises a current sensor for detecting a current passing through the switching means, and
said control means controls said switching means so that switching operation is carried out after confirmation of absence of current-flow in said switching means based on a signal detected by said current sensor.

13. An inverter apparatus, comprising:
a plurality of switching elements coupled to a direct current source,
a plurality of output terminals coupled to the switching elements,
a power source output terminal coupled to the switching elements, and
a control unit for controlling operations of the switching elements so as to operate in at least a first mode and a second mode, wherein:
the first mode supplies an alternating current across the plurality of output terminals, and
the second mode supplies a direct current across the power source output terminal and one of the plurality of output terminals.

14. An inverter apparatus in accordance with claim 13, wherein the second mode supplies the direct current to a resistance load.

15. An inverter apparatus in accordance with claim 12, wherein the second mode supplies the direct current to an electric heater.

16. A method for operating an inverter apparatus, comprising the steps of:
operating in a first mode which supplies an alternating current to one or more output terminals,
operating in a second mode which supplies a direct current across a power source output terminal and the one or more output terminals, and
switching the output terminals between one or more loads and a motor.

17. The method for operating an inverter apparatus of claim 16, wherein:
the switching step is performed when there is no current supplied to the one or more output terminals.

* * * * *